United States Patent
Chauvin et al.

(10) Patent No.: US 11,659,566 B2
(45) Date of Patent: May 23, 2023

(54) MODIFIED USE OF A GRANT ALLOCATION

(71) Applicant: QUALCOMM Incorporated, San Diego, CA (US)

(72) Inventors: Michel Evan Chauvin, San Diego, CA (US); Arnaud Meylan, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 43 days.

(21) Appl. No.: 17/124,315

(22) Filed: Dec. 16, 2020

(65) Prior Publication Data

US 2021/0195629 A1 Jun. 24, 2021

Related U.S. Application Data

(60) Provisional application No. 62/950,047, filed on Dec. 18, 2019.

(51) Int. Cl.
*H04W 72/14* (2009.01)
*H04W 72/23* (2023.01)
*H04L 1/00* (2006.01)

(52) U.S. Cl.
CPC ........... *H04W 72/23* (2023.01); *H04L 1/0009* (2013.01)

(58) Field of Classification Search
CPC ............... H04W 72/14; H04W 52/343; H04W 72/1268; H04L 1/0009; H04L 1/0003; H04L 1/0008
See application file for complete search history.

(56) References Cited

U.S. PATENT DOCUMENTS

| | | | |
|---|---|---|---|
| 2016/0226690 A1* | 8/2016 | Hessler | H04L 1/0032 |
| 2016/0227579 A1* | 8/2016 | Stacey | H04W 74/0833 |
| 2018/0323940 A1 | 11/2018 | Rico Alvarino et al. | |
| 2019/0007959 A1* | 1/2019 | Hwang | H04W 72/0446 |
| 2020/0383134 A1* | 12/2020 | Tirronen | H04W 80/02 |
| 2021/0105098 A1* | 4/2021 | Matsuda | H04L 1/1819 |

OTHER PUBLICATIONS

Ericsson; "TB sizes and UL grant for Msg3"; 3GPP TSG-RAN WG2 #1-1 R2-1803080; Athens, Greece; Feb. 26-Mar. 2, 2018; 7 pages.*
International Search Report and Written Opinion for International Application No. PCT/US2020/065694, dated Mar. 26, 2021; 16 pages.
Ericsson; "TB sizes and UL grant for Msg3"; 3GPP TSG-RAN WG2 #101 R2-1803080; Athens, Greece; Feb. 26-Mar. 2, 2018; 7 pages.
OPPO; "Inter UE Tx prioritization and multiplexing"; 3GPP TSG RAN WG1 #98bis R1-1910623; Chongqing, China Oct. 14-20, 2019; 10 pages.

\* cited by examiner

*Primary Examiner* — Walli Z Butt
(74) *Attorney, Agent, or Firm* — Loza & Loza, LLP

(57) ABSTRACT

Aspects relate to using less than all of an allocation for sending information. For example, a first device such as a user equipment (UE) may receive a grant from a second device such as a base station (e.g., a gNB) where the grant identifies resources and/or a modulation and coding scheme (MCS) allocated to the first device for a transmission. Due to one or more factors, the first device may elect to not use all of the allocated resources and/or may elect to use a lower MCS value. In some implementations, the first device may send an indication of this election to the second device. In some implementations, the first device may send information in a first subset of the allocated resources and apply puncturing to a second subset of the allocated resource.

26 Claims, 16 Drawing Sheets

SHORT DURATION PUCCH

LONG DURATION PUCCH

MODIFIED USE OF A GRANT ALLOCATION

CROSS-REFERENCE TO RELATED APPLICATION(S)

The present application for patent claims priority to and the benefit of U.S. Provisional Application No. 62/950,047, filed Dec. 18, 2019, and assigned to the assignee hereof and hereby expressly incorporated by reference herein as if fully set forth below in its entirety and for all applicable purposes.

TECHNICAL FIELD

The technology discussed below relates generally to wireless communication and, more particularly, to using a modification of an allocation that was indicated by a wireless communication grant.

INTRODUCTION

Next-generation wireless communication systems (e.g., 5GS) may include a 5G core network and a 5G radio access network (RAN), such as a New Radio (NR)-RAN. The NR-RAN supports communication via one or more cells. For example, a wireless communication device such as a user equipment (UE) may access a first cell of a first base station (BS) such as a gNB and/or access a second cell of a second base station.

A base station may schedule access to a cell to support access by multiple UEs. For example, a base station may allocate different resources (e.g., time domain and frequency domain resources) for different UEs operating within a cell of the base station.

In some examples, a base station may send an uplink grant to a UE, where the uplink grant specifies which resource blocks and/or which modulation and coding scheme (MCS) the base station has allocated to the UE for an uplink transmission. Since the demand for such resources may be high in a wireless communication system, it is important to efficiently use allocated resources.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In some examples, a method for wireless communication at a user equipment may include receiving a grant that identifies at least one allocation for the user equipment, selecting a first allocation that is a subset of the at least one allocation, and sending information to a base station via the first allocation. The at least one allocation may include at least one resource.

In some examples, a user equipment may include an interface (e.g., a transceiver) and a processing circuit (e.g., a processor) coupled to the interface. The processing circuit may be configured to receive via the interface a grant that identifies at least one allocation for the user equipment, select a first allocation that is a subset of the at least one allocation, and send information to a base station via the first allocation. The at least one allocation may include at least one resource.

In some examples, a user equipment may include means for receiving a grant that identifies at least one allocation for the user equipment, means for selecting a first allocation that is a subset of the at least one allocation, and means for sending information to a base station via the first allocation. The at least one allocation may include at least one resource.

In some examples, an article of manufacture for use by a user equipment includes a computer-readable medium having stored therein instructions executable by one or more processors of the user equipment to receive a grant that identifies at least one allocation for the user equipment, select a first allocation that is a subset of the at least one allocation, and send information to a base station via the first allocation. The at least one allocation may include at least one resource.

One or more of the following features may be applicable to one or more of the method, the apparatuses, and the computer-readable medium of the preceding paragraphs. The at least one resource may include at least one of a code block group (CBG), a resource block (RB), a resource block group (RBG), or a combination thereof. The at least one resource may be at least one code block. At least one indication that specifies a quantity (the number) and/or at least one position of the at least one code block in the subset may be sent. Sending the information may include applying puncturing to the at least one resource. At least one indication of the selection of the first allocation may be sent to the base station.

In some examples, a method for wireless communication at a base station may include sending a grant that identifies at least one allocation for a user equipment to send information, determining that the user equipment selected a first allocation that is a subset of the at least one allocation, and receiving the information from the user equipment via the first allocation. The at least one allocation may include at least one resource.

In some examples, a base station may include an interface (e.g., a transceiver) and a processing circuit (e.g., a processor) coupled to the interface. The processing circuit may be configured to send via the interface a grant that identifies at least one allocation for a user equipment to send information, determine that the user equipment selected a first allocation that is a subset of the at least one allocation, and receive the information from the user equipment via the first allocation. The at least one allocation may include at least one resource.

In some examples, a base station may include means for sending a grant that identifies at least one allocation for a user equipment to send information, means for determining that the user equipment selected a first allocation that is a subset of the at least one allocation, and means for receiving the information from the user equipment via the first allocation. The at least one allocation may include at least one resource.

In some examples, an article of manufacture for use by a base station includes a computer-readable medium having stored therein instructions executable by one or more processors of the base station to send a grant that identifies at least one allocation for a user equipment to send information, determine that the user equipment selected a first allocation that is a subset of the at least one allocation, and receive the information from the user equipment via the first allocation. The at least one allocation may include at least one resource.

One or more of the following features may be applicable to one or more of the method, the apparatuses, and the computer-readable medium of the preceding paragraphs. The at least one resource may include at least one of a code block group (CBG), a resource block (RB), a resource block group (RBG), or a combination thereof. The at least one resource may be at least one code block. At least one indication that specifies a quantity (the number) and/or at least one position of the at least one code block in the subset may be received. A determination may be made that a first subset of the at least one resource has been subjected to puncturing. Receiving the information may include receiving the information from the user equipment via a second subset of the at least one resource that is different from the first subset of the at least one resource.

In some examples, a method for wireless communication at a user equipment may include receiving a grant that identifies at least one allocation for the user equipment. The at least one allocation may specify a first modulation and coding scheme (MCS). The method may further include selecting a second MCS that is lower that the first MCS and sending information to a base station using the second MCS.

In some examples, a user equipment may include an interface (e.g., a transceiver) and a processing circuit (e.g., a processor) coupled to the interface. The processing circuit may be configured to receive a grant that identifies at least one allocation for the user equipment. The at least one allocation may specify a first modulation and coding scheme (MCS). The processing circuit may be further configured to select a second MCS that is lower that the first MCS and send information to a base station using the second MCS.

In some examples, a user equipment may include means for receiving a grant that identifies at least one allocation for the user equipment. The at least one allocation may specify a first modulation and coding scheme (MCS). The user equipment may further include means for selecting a second MCS that is lower that the first MCS and means for sending information to a base station using the second MCS.

In some examples, an article of manufacture for use by a user equipment includes a computer-readable medium having stored therein instructions executable by one or more processors of the user equipment to receive a grant that identifies at least one allocation for the user equipment. The at least one allocation may specify a first modulation and coding scheme (MCS). The computer-readable medium may also have stored therein instructions executable by one or more processors of the user equipment to select a second MCS that is lower that the first MCS and send information to a base station using the second MCS.

One or more of the following features may be applicable to one or more of the method, the apparatuses, and the computer-readable medium of the preceding paragraphs. A determination may be made that a lower MCS than the first MCS should be used for sending the information. Selecting the second MCS may be triggered based on the determination. An MCS table may be accessed and a subset of the MCS table may be used for selecting the first MCS. At least one indication may be sent specifying that the apparatus used a lower MCS than the first MCS to send the information and/or specifying a value of the first MCS.

In some examples, a method for wireless communication at a base station may include sending a grant that identifies at least one allocation for the user equipment. The at least one allocation may specify a first modulation and coding scheme (MCS). The method may further include determining that the user equipment selected a second MCS that is lower that the first MCS and receiving information from the user equipment using the second MCS.

In some examples, a base station may include an interface (e.g., a transceiver) and a processing circuit (e.g., a processor) coupled to the interface. The processing circuit may be configured to send a grant that identifies at least one allocation for the user equipment. The at least one allocation may specify a first modulation and coding scheme (MCS). The processor and the memory may also be configured to determine that the user equipment selected a second MCS that is lower that the first MCS and receive information from the user equipment using the second MCS.

In some examples, a base station may include means for sending a grant that identifies at least one allocation for the user equipment. The at least one allocation may specify a first modulation and coding scheme (MCS). The base station may further include means for determining that the user equipment selected a second MCS that is lower that the first MCS and means for receiving information from the user equipment using the second MCS.

In some examples, an article of manufacture for use by a base station includes a computer-readable medium having stored therein instructions executable by one or more processors of the base station to send a grant that identifies at least one allocation for the user equipment. The at least one allocation may specify a first modulation and coding scheme (MCS). The computer-readable medium may also have stored therein instructions executable by one or more processors of the base station to determine that the user equipment selected a second MCS that is lower that the first MCS and receive information from the user equipment using the second MCS.

One or more of the following features may be applicable to one or more of the method, the apparatuses, and the computer-readable medium of the preceding paragraphs. Determining that the user equipment selected a second MCS may include receiving at least one indication specifying that the user equipment used a lower MCS than the first MCS to send the information. Determining that the user equipment selected a second MCS may include receiving at least one indication specifying a value of the second MCS. An indication of an MCS value that the user equipment used to send the information may be received. Receiving the information may include receiving the information using the MCS value.

These and other aspects of the disclosure will become more fully understood upon a review of the detailed description, which follows. Other aspects, features, and embodiments of the present disclosure will become apparent to those of ordinary skill in the art, upon reviewing the following description of specific, example embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while example embodiments may be discussed below as device, system, or method embodiments it should be understood that such example embodiments can be implemented in various devices, systems, and methods.

DETAILED DESCRIPTION

Figure 1:
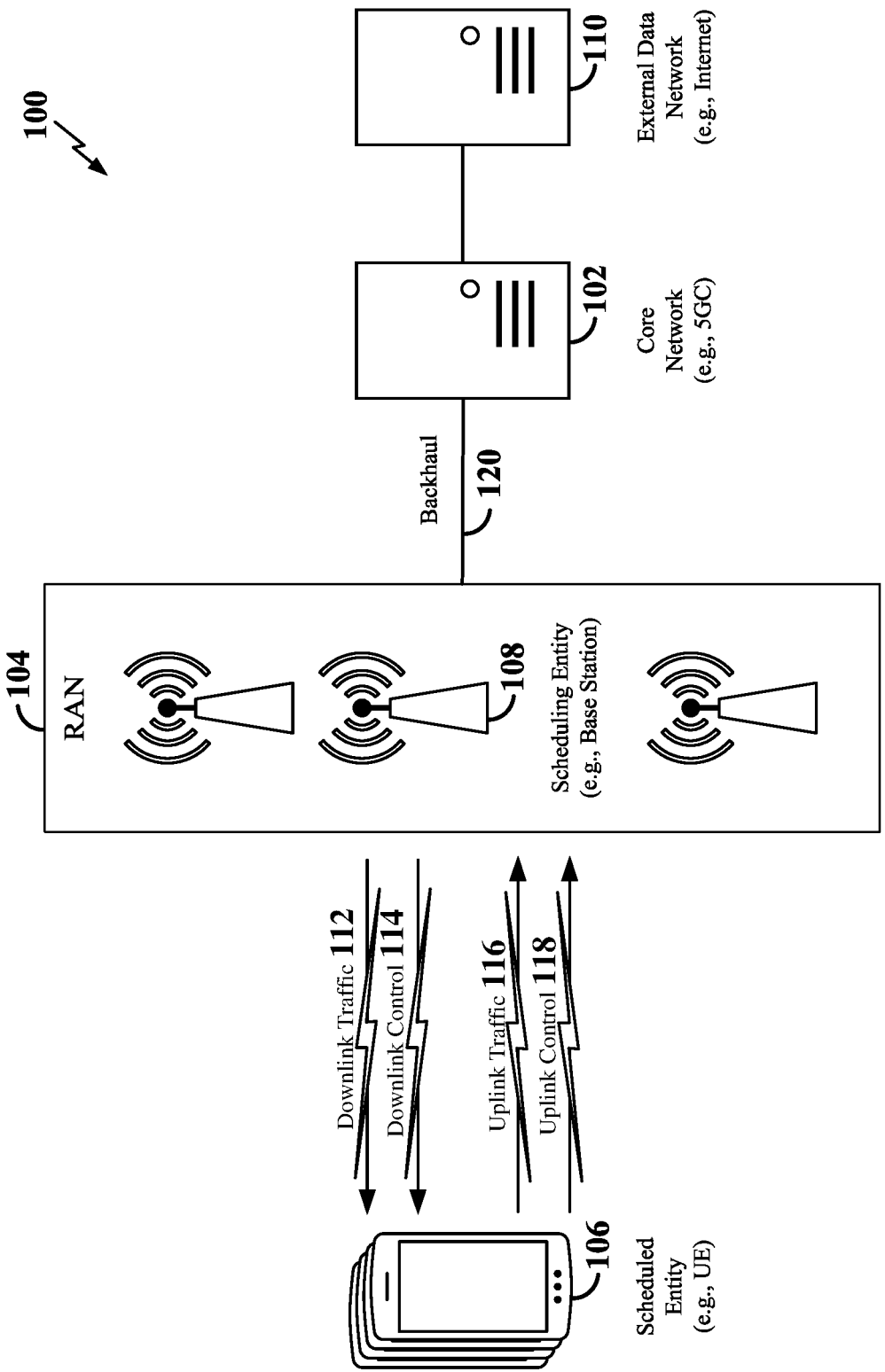
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/ purchasing devices, medical devices, artificial intelligence-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Various aspects of the disclosure relate to using less than all of an allocation for sending information. For example, a first wireless communication device such as a user equipment (UE) may receive a grant from a second wireless communication device such as a base station (e.g., a gNB) where the grant identifies resources and/or a modulation and coding scheme (MCS) allocated to the first wireless communication device for a transmission. Due to one or more factors, the first wireless communication device may elect to not use all of the allocated resources and/or may elect to use a lower MCS value. In some implementations, the first wireless communication device may send an indication of this election (e.g., indicating the resources and/or MCS that will be used) to the second wireless communication device. In some implementations, the first wireless communication device may send information in a first subset of the allocated resources and apply puncturing to a second subset of the allocated resource.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and at least one scheduled entity 106. The at least one scheduled entity 106 may be referred to as a user equipment (UE) 106 in the discussion that follows. The RAN 104 includes at least one scheduling entity 108. The at least one scheduling entity 108 may be referred to as a base station (BS) 108 in the discussion that follows. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be co-located or non-co-located. The TRPs may communicate on the same carrier frequency or different carrier frequencies within the same frequency band or different frequency bands.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
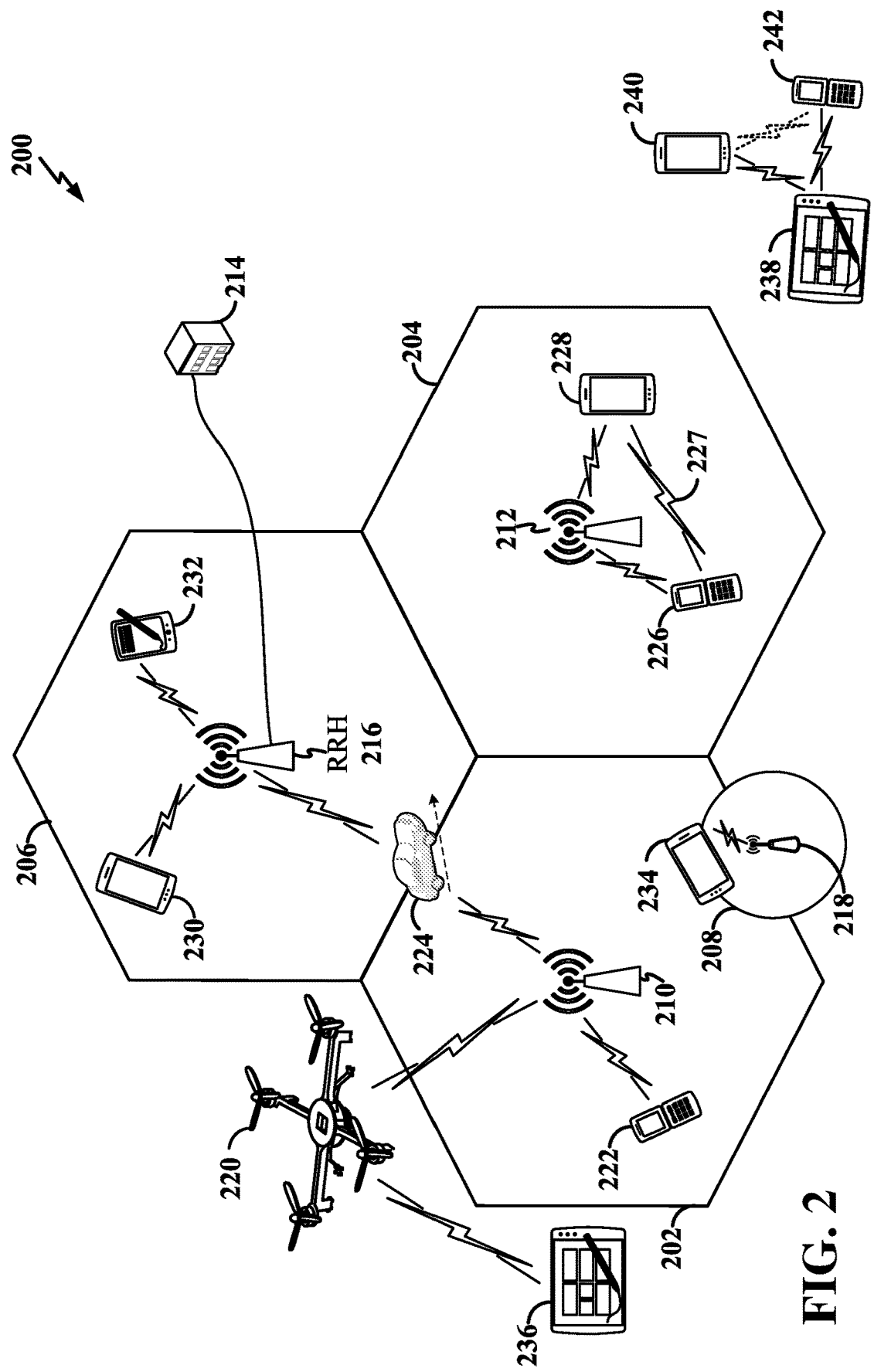
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network (e.g., as illustrated in FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 236, 238, 240, and/or 242 may be the same as the UE/scheduled entity 106 described above and illustrated in FIG. 1.

In some examples, an unmanned aerial vehicle (UAV) 220, which may be a drone or quadcopter, can be a mobile network node and may be configured to function as a UE. For example, the UAV 220 may operate within cell 202 by communicating with base station 210. In some examples, a UAV 220 may be configured to function as a BS (e.g., serving a UE 236). That is, in some examples, a cell may not necessarily be stationary, and the geographic area of the cell may move according to the location of a mobile base station such as a UAV 220.

In the radio access network 200, the ability for a UE to communicate while moving, independent of its location, is referred to as mobility. The various physical channels between the UE and the radio access network are generally set up, maintained, and released under the control of an access and mobility management function (AMF). The AMF (not shown in FIG. 2) may include a security context management function (SCMF) that manages the security context for both the control plane and the user plane functionality, and a security anchor function (SEAF) that performs authentication.

A radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancelation technologies. Full-duplex emulation is frequently implemented for wireless links by utilizing frequency division duplex (FDD) or spatial division duplex (SDD). In FDD, transmissions in different directions operate at different carrier frequencies. In SDD, transmissions in different directions on a given channel are separate from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to as sub-band full-duplex (SBFD), also known as flexible duplex.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the UE 238 (e.g., functioning as a scheduling entity). Thus, in a wireless communication system with scheduled access to time-frequency resources and having a cellular configuration, a P2P configuration, or a mesh configuration, a scheduling entity and one or more scheduled entities may communicate utilizing the scheduled resources. In some examples, the sidelink signals 227 include sidelink traffic (e.g., a physical sidelink shared channel) and sidelink control (e.g., a physical sidelink control channel).

In some examples, two or more UEs (e.g., UEs 226 and 228) within the coverage area of a serving base station 212 may communicate with both the base station 212 using cellular signals and with each other using direct link signals (e.g., sidelink signals 227) without relaying that communication through the base station. In an example of a V2X network within the coverage area of the base station 212, the base station 212 and/or one or both of the UEs 226 and 228 may function as scheduling entities to schedule sidelink communication between UEs 226 and 228.

Figure 3:
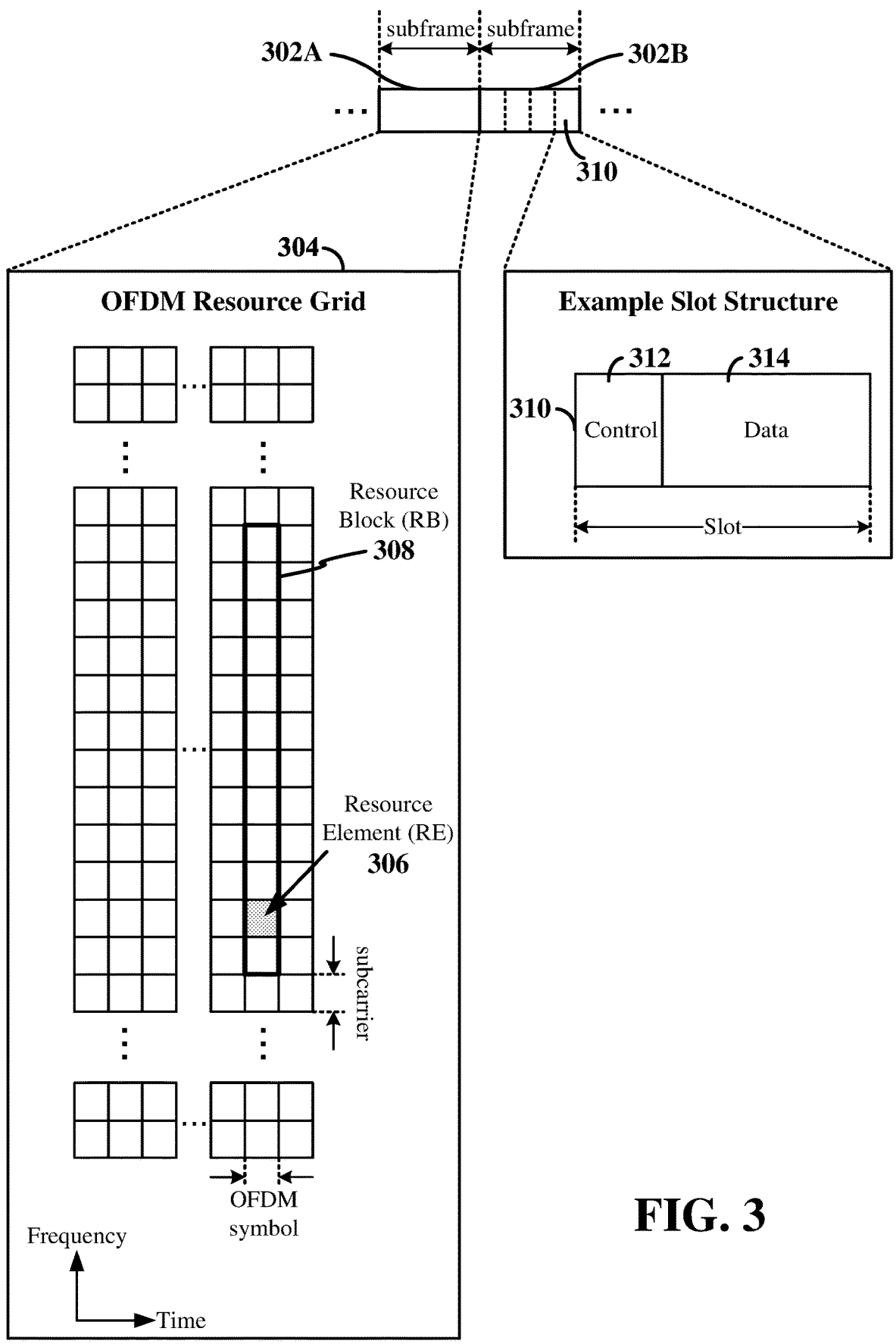
FIG. 3 is a schematic illustration of an example of wireless resources in an air interface utilizing orthogonal frequency divisional multiplexing (OFDM) according to some aspects.

Various aspects of the present disclosure will be described with reference to an OFDM waveform, an example of which is schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Referring now to FIG. 3, an expanded view of an example DL subframe (SF) 302A is illustrated, showing an OFDM resource grid 304. However, as those skilled in the art will readily appreciate, the physical layer (PHY) transmission structure for any particular application may vary from the example described here, depending on any number of factors. Here, time is in the horizontal direction with units of OFDM symbols; and frequency is in the vertical direction with units of subcarriers. 5G NR supports a scalable numerology where different numerologies may be used for different radio frequency spectrums, different bandwidths, and the like. For example, sub-carrier spacings (SCSs) of 15 kHz, 30 kHz, 60 kHz, etc., may be used in different scenarios.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

Scheduling of UEs (e.g., scheduled entities) for downlink, uplink, or sidelink transmissions typically involves scheduling one or more resource elements 306 within one or more sub-bands or bandwidth parts (BWPs). Each BWP may include two or more contiguous or consecutive RBs. Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, RSU, etc.) or may be self-scheduled by a UE implementing D2D sidelink communication.

In this illustration, the RB 308 is shown as occupying less than the entire bandwidth of the subframe 302A, with some subcarriers illustrated above and below the RB 308. In a given implementation, the subframe 302A may have a bandwidth corresponding to any number of one or more RBs 308. Further, in this illustration, the RB 308 is shown as occupying less than the entire duration of the subframe 302A, although this is merely one possible example.

Each 1 ms subframe 302A may consist of one or multiple adjacent slots. In the example shown in FIG. 3, one subframe 302B includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The structure illustrated in FIG. 3 is merely an example, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS), a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In some examples, a slot 310 may be utilized for broadcast or unicast communication. In V2X or D2D networks, a broadcast communication may refer to a point-to-multipoint transmission by a one device (e.g., a vehicle, base station (e.g., RSU, gNB, eNB, etc.), UE, or other similar device) to other devices. A unicast communication may refer to a point-to-point transmission by a one device to a single other device.

In an example, the control region 312 of the slot 310 may include a physical downlink control channel (PDCCH) including downlink control information (DCI) transmitted by a base station (e.g., gNB, eNB, RSU, etc.) towards one or more of a set of UEs, which may include one or more sidelink devices (e.g., V2X/D2D devices). In some examples, the DCI may include synchronization information to synchronize communication by a plurality of sidelink devices on the sidelink channel. In addition, the DCI may include scheduling information indicating one or more resource blocks within the control region 312 and/or data region 314 allocated to sidelink devices for sidelink communication. For example, the control region 312 of the slot may further include control information transmitted by sidelink devices over the sidelink channel, while the data region 314 of the slot 310 may include data transmitted by sidelink devices over the sidelink channel. In some examples, the control information may be transmitted within a physical sidelink control channel (PSCCH), while the data may be transmitted within a physical sidelink shared channel (PSSCH).

In a DL transmission (e.g., over the Uu interface), the transmitting device (e.g., the scheduling entity) may allocate one or more REs 306 (e.g., within a control region 312) to carry DL control information including one or more DL control channels, such as a PBCH; and/or a physical downlink control channel (PDCCH), etc., to one or more scheduled entities. The transmitting device may further allocate one or more REs 306 to carry other DL signals, such as a DMRS; a phase-tracking reference signal (PT-RS); a channel state information-reference signal (CSI-RS); a primary synchronization signal (PSS); and a secondary synchronization signal (SSS).

The PDCCH may carry downlink control information (DCI) including but not limited to power control commands, scheduling information, a grant, and/or an assignment of REs for DL and UL transmissions. The PHY carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission (e.g., over the Uu interface), the transmitting device (e.g., the scheduled entity) may utilize one or more REs 306 to carry UL control information including one or more UL control channels, such as a physical uplink control channel (PUCCH), to the scheduling entity. UL control information may include a variety of packet types and categories, including pilots, reference signals, and information configured to enable or assist in decoding uplink data transmissions. For example, the UL control information may include a DMRS or SRS. In some examples, the control information may include a scheduling request (SR), i.e., request for the scheduling entity to schedule uplink transmissions. Here, in response to the SR transmitted on the control channel, the scheduling entity may transmit downlink control information that may schedule resources for uplink packet transmissions. UL control information may also include HARQ feedback, channel state feedback (CSF), or any other suitable UL control information.

In addition to control information, one or more REs 306 (e.g., within the data region 314) may be allocated for user data or traffic data. Such traffic may be carried on one or more traffic channels, such as, for a DL transmission, a PDSCH; or for an UL transmission, a physical uplink shared channel (PUSCH). In some examples, one or more REs 306 within the data region 314 may be configured to carry SIBs (e.g., SIB1), carrying system information that may enable access to a given cell.

The physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above with reference to FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

5G NR may prove relatively high throughput through the use of large bandwidths (e.g., bandwidths greater than 100 MHz) and/or a high MCS. In some cases, a UE may receive more physical uplink shared channel (PUSCH) resources via an uplink (UL) grant than the UE can or wants to use. Alternatively, or in addition, a gNB may assign a higher MCS to the UE than the UE can support or want to use (e.g., due to limited UL transmit power at the UE).

In some scenarios, the above issues may be the result of a scheduler being inefficient and/or relatively simple. For example, predictive UL scheduling at a gNB may give the UE extra UL grants (e.g., to keep latency low, to provide generous scheduling, etc.) and/or relatively high MCS. Thus, a gNB may grant the UE additional and larger grants and/or a higher MCS than necessary.

In some scenarios, the above issues may be the result of UE traffic being limited by unpredictable maximum permissible exposure (MPE) limits. For example, millimeter wave (mmW) communication may be constrained by an MPE limit specified by the Federal Communications Commission (FCC) or some other regulatory body. At large bandwidths, large grants can force the UE to use all of the available MPE power quickly. As a result, the UE may need to reduce the transmit (TX) power or shut off its transmitter to comply with FCC MPE limits. This can impact PUCCH and, in turn, the downlink performance and the entire radio connection. This may impact PUSCH as well in the event the TX power is lower than expected by the network.

A UE might not be able to or might not want to transmit via all of the granted resources that a gNB has allocated for the UE and/or a UE might only have enough power to reliably transmit at a lower MCS (to maintain a reliable block error rate, BLER). As a specific example, a UE may classify PUSCH traffic as low importance, medium importance, or high importance. In some cases, none, one, or two of these types of traffic are allowed at a given point in time. In this case, there may be a risk that data becomes obsolete (e.g., discard timers may be triggered). As another specific example, taking into consideration available UL transmit power (MPE limits) and UE battery power, it would be preferable if the UE is able to choose: 1) when it transmits, 2) the MCS the UE uses (considering the maximum transmit power (Pmax)), 3) how much of an UL grant the UE uses, 4) or any combination thereof. While some gNB UL scheduler errors can be improved by better UL scheduler implementations, MPE-limited situations are unpredictable and might not be solved by improving the UL scheduler.

Several examples of unforeseen/unpredictable scenarios and/or scheduler errors/issues that may lead to over-granting are described in detail below. These examples include MPE-limited scenarios, aged data scenarios, scheduling mismatch scenarios, and grant size error scenarios.

In some scenarios, a UE might not be able to use, or want to use, the entire uplink grant(s) in one or more of the following MPE-limited situations. For example, if the UE transmits on all of the granted resources, the UE may need to reduce its transmit power to meet the MPE limit (e.g., which may correspond to an average transmit power over a period of time). However, such a reduction in transmit power may adversely affect the BLER at the receiver of the transmission.

In a first situation, an MPE sensor in the UE may have initially not detected human tissue (e.g., skin of a user), resulting in the UE reporting a large power headroom report (PHR) to a gNB. However, by the time the UE receives the corresponding UL grant from the gNB, the MPE module has detected human tissue nearby or an MPE update occurred and the new MPE Pmax imposed on the UE's uplink is very limiting. In these cases, the UE may no longer want to perform the UL transmission or it may decide it can only transmit a small amount of high priority data. However, a UE completely skipping the PUSCH transmission could lead to radio resource management issues as the gNB may decide that the UE went out of service.

In a second situation, the UE initially had a good MPE budget and the UE therefore sent a large PHR to the gNB. While waiting for an UL grant (scheduling delay), the UE received a large amount of downlink (DL) data for which the UE had to send DL HARQ feedback on the uplink (e.g., via PUCCH). In this case, a significant portion of the MPE budget was spent on the PUCCH transmissions. Consequently, the UE is left with a very small MPE budget. Thus, the UE might not be able to transmit low priority traffic (PUSCH) due to the risk of not having sufficient MPE budget left over to transmit high priority signaling (PUCCH) and TCP ACKs (which could severely limit the DL performance).

In a third situation, the UE may allocate its MPE budget according to traffic priority (e.g., ranging from high priority to low priority). For example, the UE could use 3 classes of traffic: class 1) PUCCH, class 2) PUSCH L2 control packet (e.g., an RLC status report to enable the downlink), and class 3) low priority PUSCH data packets. The UE may have MPE power available to transmit the higher priority traffic (class 1 and 2 traffic) but not lower priority traffic (such as class 3 traffic) which is typically much larger, and not always as delay-sensitive, as class 1 and 2 traffic.

In a fourth situation, the gNB does not know about the MPE constraints at the UE. The power headroom report (PHR) and the buffer status report (BSR) provide the gNB with some information in this regard. However, these reports are sent on PUSCH, which gets deadlocked if the grant is too big (e.g., the UE has no power for this large grant).

In a fifth situation, the reporting of the MPE-limited maximum transmit power (MPE Pmax) may be subject to delay (e.g., MPE Pmax may be reported to the gNB using the PHR). This delay may cause an error between the grant sizes the UE can currently support and the grant size the gNB thinks the UE can support. The delayed application of the new MPE Pmax may be caused, for example, by the transmission and processing delays involved in transmitting the PHR to the gNB and the UL scheduling and granting delays as well as the PHR timer and threshold settings.

In some scenarios, a UE may request an UL grant for data and then later determine that it no longer wants to transmit the data after waiting for an UL grant. For example, the data may have become aged or obsolete (e.g., data may have a relatively short discard timer, etc.). This places the UE in an unforeseen or unpredictable position where the UE may only have a small amount of data left to transmit.

In some scenarios, there may be a mismatch between the UE's desired grant size and the grants allocated by the gNB. The gNB may decide that it is in the best interest of the UE to over-grant the UE. For example, to reduce latency and flush the UE's buffers after a long SR-BSR-UL grant wait cycle, the gNB may give the UE a larger grant when the UE is the only UE in the gNB's cell, or when the UE is the last UE to be scheduled by the gNB and there are available resources. If the UE only has a small amount of data to send in these cases, over-granting will result.

In some scenarios, gNB UL scheduling may result in a grant size error. For example, a predictive scheduler may be prone to over-granting. A processor-power-limited gNB may implement a sub-optimal UL scheduler (e.g., to handle a large number of UEs) and the sub-optimal scheduling may result in an UL grant size error.

Several examples of causes of grant size error follow. Grant size error may be introduced, for example, due to quantization of the buffer size(s) caused by BSR-to-BSR index mapping tables. Grant size error may be caused by using outdated UE Pmax information in the gNB UL scheduler. Grant size error may be caused by PHR delays (e.g., due to timer and threshold settings). Grant size error may be caused by processing delays at the UE and the gNB. Grant size error may be caused by transmission delays of PHR from the UE to the gNB and/or transmission delays of the UL grant from the gNB to the UE.

In the above scenarios, if a UE receives larger grants (e.g., with more resources and/or higher MCS than needed) than are needed or desired, the UE has two options. One, the UE can use the large grant (possibly using lower power than requested based on MPE Pmax). Two, the UE can skip the grant.

If the UE only has a small amount of data to send and the UE uses the large grant at the assigned MCS, more power is used than needed (e.g., power may be wasted on padding). This may lead to faster MPE shut off.

If the UE uses the unnecessarily large UL grant, at the higher than supported MCS (e.g., the assigned MCS), the BLER of the UL transmission may increase and thus increase the chances of needing to retransmit a larger than necessary transport block (TB). Each retransmission of the large TB leads to further UL power waste. Here, the potential wasted power per TB may be defined as: $P_{total\_wasted\_per\_TB} = P_{wasted} * N$ (re)transmissions.

Figure 4:
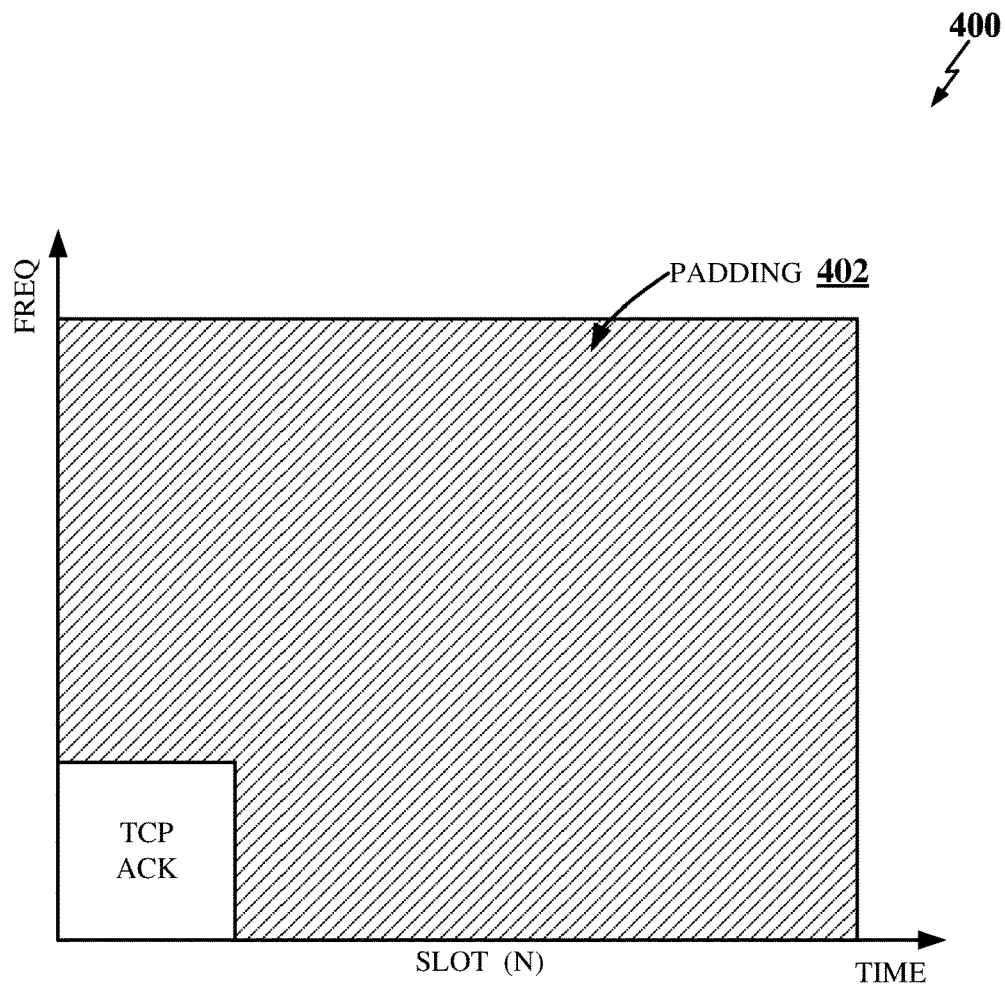
FIG. 4 is a diagram illustrating examples of inefficient resource usage according to some aspects.
Figure 4:
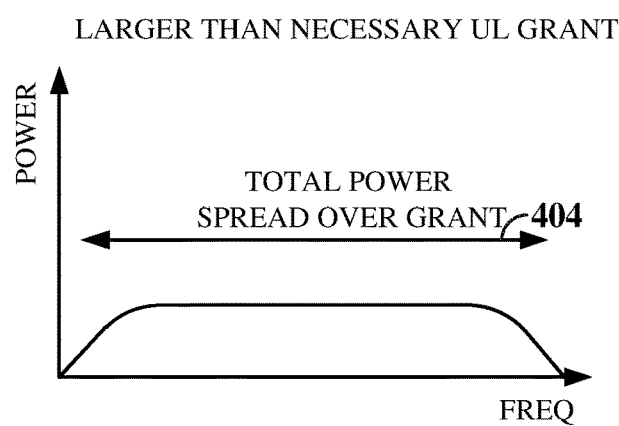

If the UE is UL power limited by MPE, the UE may choose to transmit a small amount of data. As shown in FIG. 4, substantial power may be wasted on padding 402 in such a case. In addition, the total transmit power may be spread over a wider bandwidth 404 as shown in FIG. 4. This may increase the block error rate (BLER) and the likelihood of needing to retransmit.

The disclosure relates in some aspects to allowing a UE to choose how much of a granted resource (e.g., PUSCH) the UE will use and/or which MCS the UE will use. For example, the UE may skip transmitting in the remaining (unused) portion of the grant and/or the UE may elect to use a lower MCS than was allocated by the grant.

Four example implementations are described below. The first example implementation involves in some aspects using a dynamic UL transmission size (using modified transmission parameters) and uplink control information (UCI) for detection. The second example implementation involves in some aspects using a dynamic UL transmission size (using the same transmissions parameters) at the UE and using puncturing and blind decoding at the gNB for detection or using UCI for detection. The third example implementation involves in some aspects using dynamic MCS selection at the UE and blind decoding at the gNB or UCI for detection. The fourth example implementation involves in some aspects a combination of the first and third example implementations or a combination of the second and third example implementations.

In some aspects, one or more of the features described herein may impact one of more standards. Nonlimiting examples of such standards may include sections TS 38.213-38-214 of the 3GPP PHY standards (e.g., v15.7.0 and/or other versions) and section TS 38.321 of the 3GPP MAC standard (e.g., v15.7.0 and/or other versions).

Figure 5:
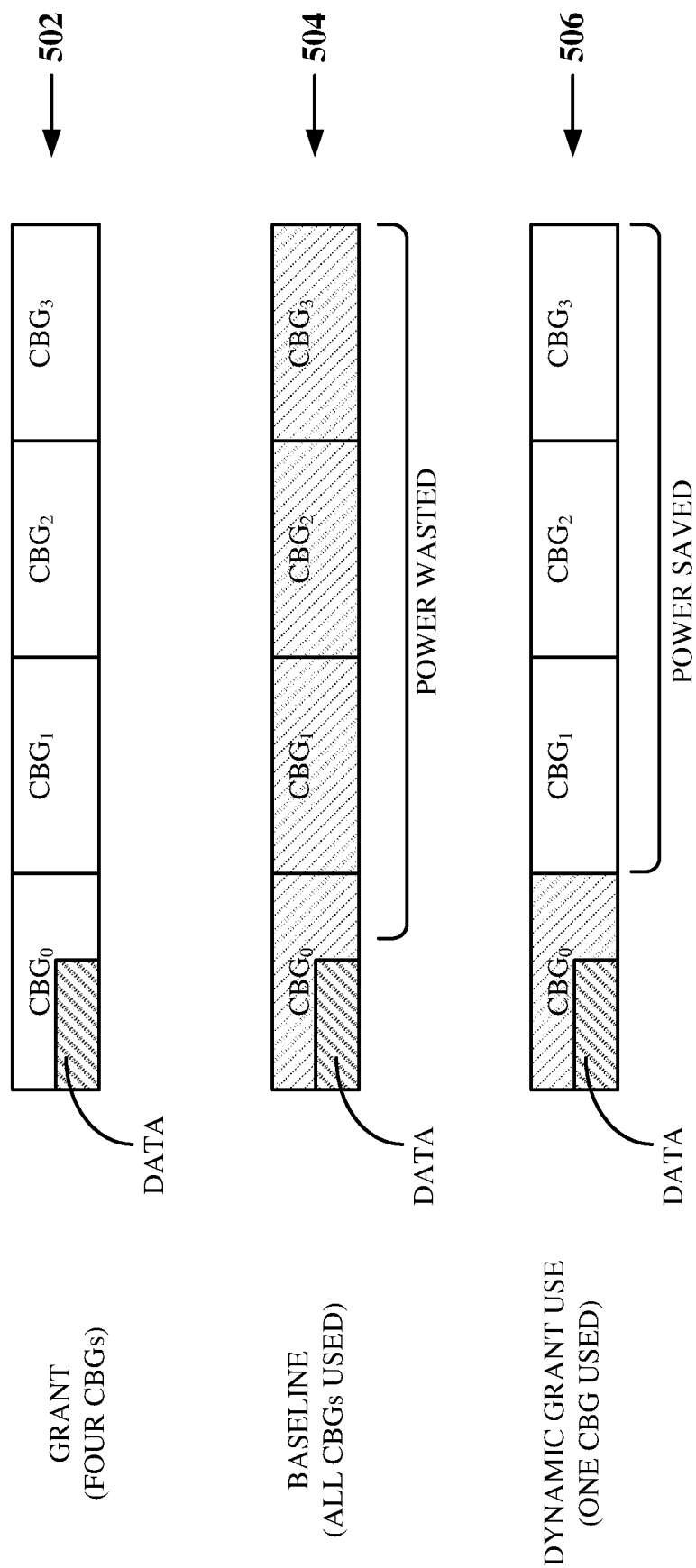
FIG. 5 is a diagram illustrating examples of use of grant resources according to some aspects.

In a first implementation, a UE may indicate that it will only use a portion of a grant. For example, a UE may signal the size of the UL grant it uses by transmitting uplink control information (UCI) along with the UL transmission. The number of resources (e.g., code block groups (CBGs), code blocks (CBs), resource block groups (RBGs) or resource blocks (RBs)) that the UE uses may be communicated to the gNB in the UCI as one example. In this case, the transport block (TB) wide CRC may be omitted to partition information bits along CBG boundaries or other boundaries. It may be beneficial to limit the number of choices given to the UE to reduce the associated UCI signaling size. For this reason, the CBG option may be advantageous. FIG. 5 illustrates an example of a CBG grant 502 and how the resources are used in a baseline scenario 504 (e.g., a conventional scenario where all of the CBGs are used) and in a dynamic grant use scenario 506 that uses one of the techniques taught herein. In the scenario 506, the UE uses the first CBG. The UE may select one or more of the CBGs in some examples. The UE may select which CBG to use (e.g., not always CBG0) in some examples. If the UE does not use CBGs (e.g., for dynamic resource utilization), the UE may use other techniques to reduce the transmission size in the time domain.

The disclosure also relates in some aspects to enabling and/or disabling the dynamic grant feature. The dynamic grant utilization may add some overhead to transmissions when an indication (e.g., UCI) is used. Moreover, the feature might not be needed by some UEs. For example, a customer premises equipment (CPE) UE might not want to use the dynamic grant utilization feature if it is not power limited (e.g., if a human body is not nearby, there will not be MPE issues). Therefore, a base station may authorize the dynamic grant feature and/or a UE may request that the dynamic grant feature be enabled/disabled based on the UE's needs (e.g., using an RRC-connection request or some other signaling).

Various techniques may be used for indicating a UE's use of only a portion of a grant in accordance with the teachings herein. Several examples are described below.

In some examples, the indication (e.g., UCI) may be accessible to the UL-PHY of the gNB so that the gNB UL-PHY can interpret the UE's uplink grant correctly. For example, a UE may transmit the indication in a location that is accessible to the gNB's UL-PHY (e.g., external to the MAC protocol data unit, PDU, where it can be readily decoded by the gNB's UL-PHY).

In some examples, the indication (e.g., UCI) may be located in a location known to the gNB such as at the beginning of the original grant. The indication could be in the grant (e.g., the granted UL resources) but before the data (e.g., PUSCH data) itself (e.g., before the MAC PDU). The indication could indicate the amount of resources used by the UE, such as the number and/or position of RBs, RBGs, CBGs, etc. The number and/or position of resources used may be an efficient method to communicate the indication to the gNB, especially when the grant is divided into a large number of blocks. A small amount of overhead may be added to each transmission when the dynamic grant feature is enabled. This could be, for example, 3-6 bits to represent the resources used plus overhead due to use of a robust coding scheme (e.g., a 3-4 times increase in bits after coding, requiring up to 24 resource elements (REs)). Advantageously, this approach includes the indication with the data in a known location. Thus, a gNB's PHY (e.g., UL-PHY) can quickly decode the indication and start decoding the data with very low latency.

In some examples, the indication (e.g., UCI) may be a single bit set at the beginning of the grant (e.g., the granted UL resources). This bit may be external to the data (e.g., PUSCH data) so that it can be decoded by the gNB (e.g., the UL-PHY). This approach might be somewhat less efficient than a count (e.g., as described above) if the UL grant is divided into a large number of blocks.

In some examples, a UE could communicate the uplink resources used by the UE by transmitting an end indicator or an extension bit. In this case, the grant (e.g., the granted UL resources) may be divided into chunks, such as along RB, RBG or CBG boundaries, to reduce decoding complexity. The extension bit may be encoded onto some resources (e.g., one or more REs) after the block of data. This may be somewhat less efficient than previously mentioned schemes since n−1 indicator/extension bits may need to be decoded one by one to determine whether the n-th block contains data.

In some examples, a UE could use a DMRS in place of UCI or other indication signaling. The UE could transmit the DMRS in the portion of the grant (e.g., the granted UL resources) that is used by the UE and not transmit DMRS in the unused portion of the grant. The gNB could compare the average DMRS signal power in each block of the grant resources to determine which portion was used/unused by the UE. Here, when there is no transmission by the UE (the UE skips the transmission), there might not be DMRS to use as a reference and it may be more difficult for the gNB to decide which portion of the UL grant was used/unused. For example, if the UE does not transmit DMRS in the unused portion of the UL grant, the gNB might not have a reference. This may reduce the reliability of blind decoding compared to a method where the UE transmits DMRS across the entire UL grant and blind decoding is performed on the data, using the DMRS as a reference. Nevertheless, this approach may provide advantages in that by looking only at DMRS, instead of blind decoding data, it is likely more efficient from a gNB processing point of view. Also, this approach may save power if DMRS is not transmitted in the unused portion of the spectrum.

Figure 6:
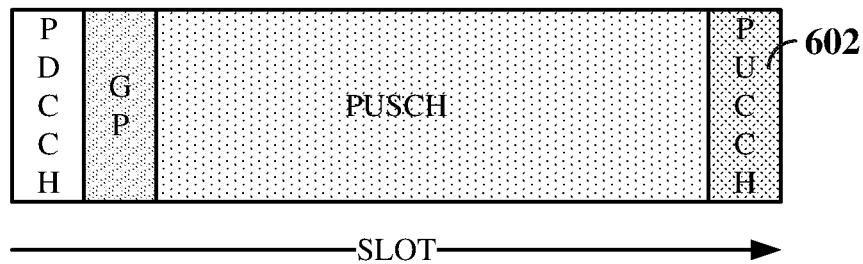
FIG. 6 is a diagram illustrating examples of communicating uplink control information according to some aspects.
Figure 6:
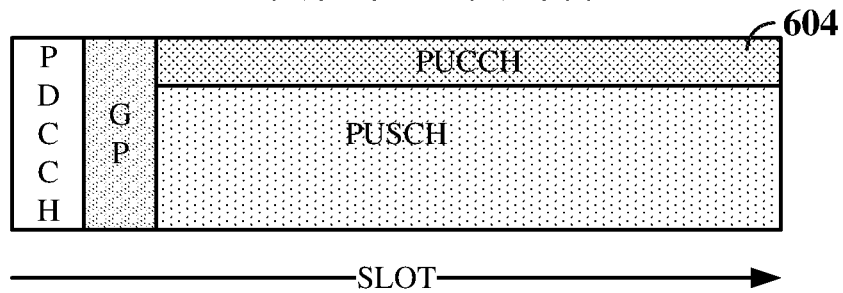

In some examples, 5G NR PUCCH can be used to transmit fast feedback of HARQ-ACK/NACK. The indication (e.g., UCI) could be inserted in the PUCCH using a new or repurposed PUCCH format to carry the dynamic UL grant utilization UCI. FIG. 6 illustrates examples of carrying the indication in PUCCH (e.g., a short duration PUCCH 602 or a long duration PUCCH 604). The position of the PUCCH (e.g., a short duration PUCCH) could also be before the PUSCH. Using PUCCH after the PUSCH transmission may introduce latency because of the PUSCH's dependency on the PUCCH. Advantageously, the PUCCH may be transmitted with robust coding schemes so that the gNB will know the size the dynamic UL grant with high confidence. Also, providing control information in a conventional control channel (PUCCH) may be easier to implement.

In a second implementation, the UE may use puncturing to achieve a transmission in a portion of the uplink grant that the UE chooses to use. In this case, the UE may prepare the PUSCH transmission using the same parameters as in a conventional transmission, but puncture the unused portion of the grant. The gNB could detect the UL transmission size using blind detection. Alternatively, or in addition, the gNB may read UCI sent by the UE to determine how to decode the transmission.

Due to MPE, a UE might not be able to transmit at scheduled power over all scheduled symbols. The UE may introduce a duty cycle itself by sending the beginning of the assigned symbols (including DMRS for demodulation and a UCI to indicate which symbols are transmitted). This may operate in some aspects like a UE-side puncturing (while rate matching and TBS calculations are as if the full assignment is transmitted). The DMRS might not be punctured.

Here, the gNB may detect the puncturing (possibly avoiding Least Likelihood Ratio (LLR) combining for retransmissions). The UCI may indicate to the gNB what is not transmitted (e.g., in pre-emption indication (PI) form (which symbol is not transmitted) or CBG transmission information (CBG-TI) form (which CBG is not transmitted)). The gNB can thus schedule retransmission and avoid LLR combining.

In another scenario, there is not enough data to fill the assignment. The UCI may carry information indicating, for example: 1) that some CBGs are not transmitted, 2) that there is no need to schedule retransmission, and 3) that there is zero padding. The UCI may indicate the size of zero padding in the TB. This may be similar in some aspects to putting MAC functionality in the PHY.

In a third implementation, a UE may use a lower MCS than was allocated by an UL grant. For example, an UE may reduce the MCS (and, optionally, combinations of MCS and resource allocation), when considering MPE Pmax, to maintain an acceptable UL transmission block error rate (BLER). For example, a power-limited UE may improve the reliability of the UL transmission by choosing an MCS that improves the BLER. Alternatively, or in addition, a UE may use a smaller MCS and TB size to reduce wasteful TB padding bytes in the case where the UE does not want or need to send a lot of data and the TB would contain padding bytes. In some aspects, this approach may trade off TB size (space for data and headers or padding bytes) for additional parity bits to increase transmission reliability.

Figure 7:
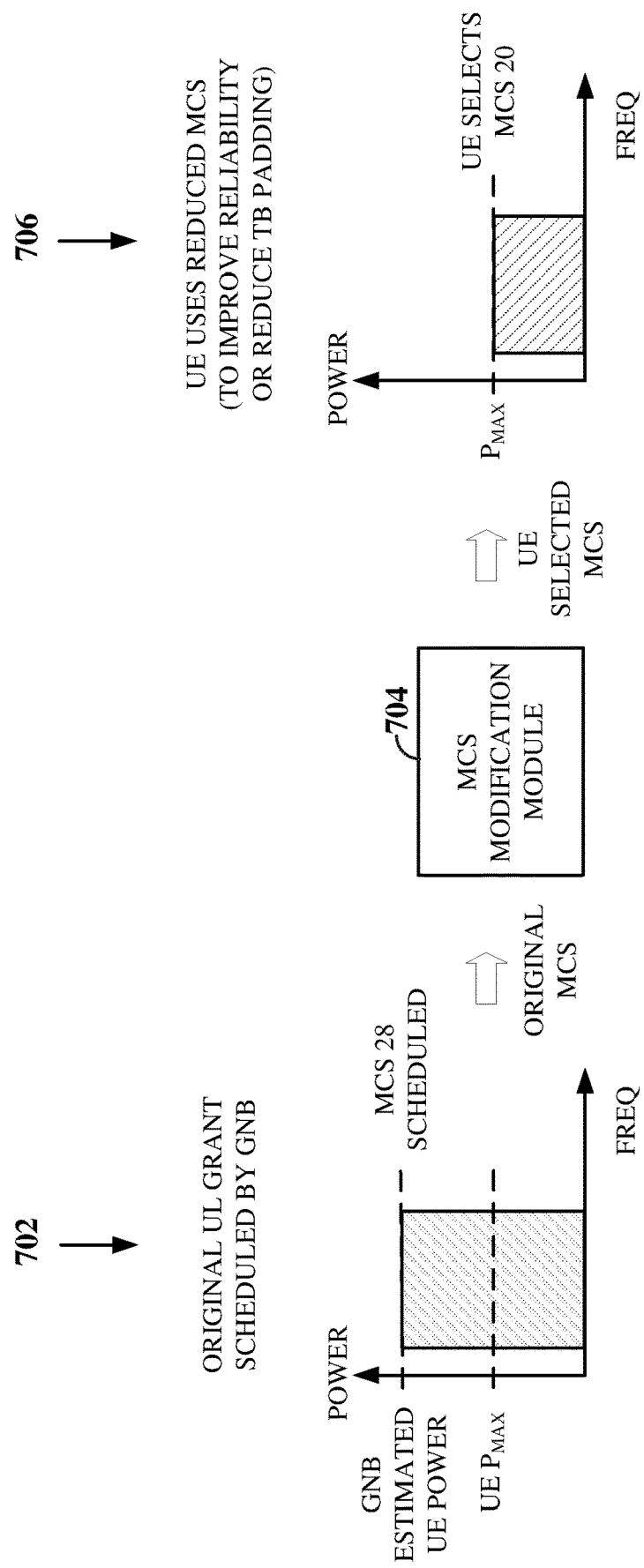
FIG. 7 is a diagram illustrating an example of dynamically selecting a modulation and coding scheme (MCS) according to some aspects.

FIG. 7 illustrates an example of dynamic MCS utilization. Here, a grant 702 scheduled an MCS of 28. In this case, an MCS modification module 704 of the UE selects a lower MCS (an MCS of 20 in this example) to, for example, improve the reliability of the transmission and/or to reduce the padding of the transport block (TB). As a result, the UE transmits 706 at a lower transmit power using the selected MCS. Table 1 illustrates an example of an MCS Table from which the MCS modification module 704 may select an MCS. The values used in Table 1 and in FIG. 7 are simplified examples showing how a set of values could be used in one implementation. Other values may be used in other implementations (e.g., depending on the range of MCS values that the network selects for the UE). Also, MCS modification schemes other than selection from a table could be used in other implementations.

TABLE 1

| REQ SNR or $P_{MAX}$ | MCS |
| --- | --- |
| −12 | 0 |
| −10 | 1 |
| −8 | 2 |
| ... | ... |
| 20 | 24 |
| 22 | 25 |
| 24 | 26 |
| 26 | 27 |
| 28 | 28 |

A UE may signal to a gNB that it will use a lower MCS than was allocated by an UL grant. For example, a UE may send an indication to a gNB that the UE has used a lower MCS or the UE may send an indication of the actual MCS value that the UE used. This signaling may involve transmitting corresponding uplink control information (UCI) along with the UL transmission, or some other form of signaling (e.g., as discussed herein for the dynamic resource usage signaling).

The following methods could be used by the gNB to decode the modified UL transmission. In some scenarios, the UE may transmit UCI containing the MCS indication to the gNB. Alternatively, the gNB may perform blind detection (e.g., by performing several rounds of decoding).

When the UE selects a new MCS, the UE could use the full MCS table or a subset of the MCS table. Using a subset of the MCS table may provide one or more of the benefits that follow. For blind detection, using a subset of the MCS table, may reduce the blind decoding search space. If UCI is used to signal the MCS used, using a subset of the MCS table can reduce the number of bits required to transmit the UCI.

In some examples, a UE may decide whether to use a lower MCS than was allocated by a grant and use fewer resources than were allocated by the grant. In this case, the UE may signal the use of fewer resources (e.g., via UCI) as in the first example implementation (e.g., a combination of the first and third example implementations) or the UE may use puncturing (e.g., a combination of the second and third example implementations). Due to the complexity and large search space that may be used in this embodiment, a larger UCI may be used to signal to the gNB the MCS and/or the UL transmission size (e.g., CBGs, RBGs or RBs) used by the UE.

Figure 8:
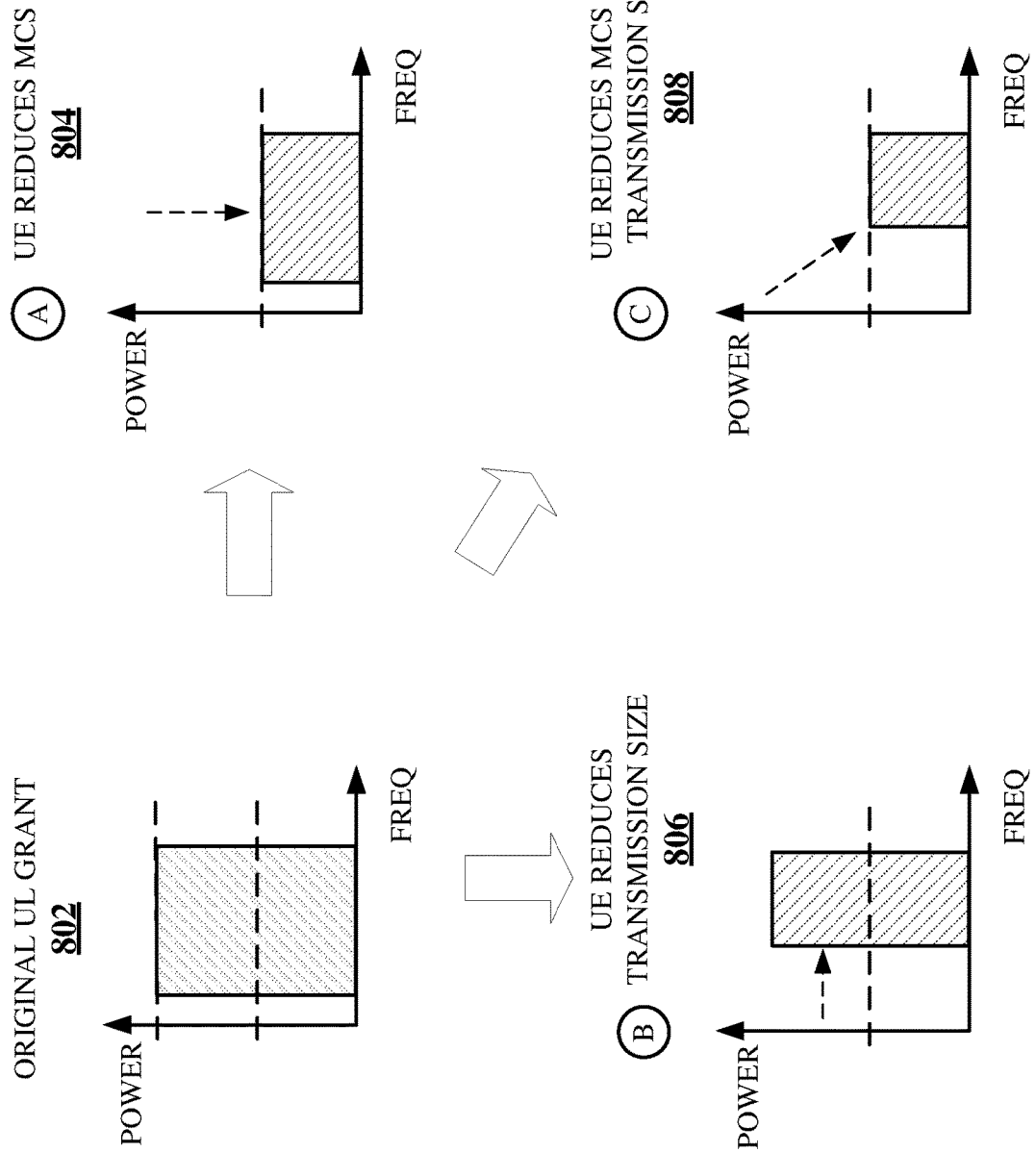
FIG. 8 is a diagram illustrating an example of dynamically selecting resources and/or MCS according to some aspects.

In some examples, a UE may dynamically decide whether to use a lower MCS than was allocated by a grant and/or use fewer resources than were allocated by the grant. FIG. 8 illustrates an example where a grant 802 scheduled a certain number of resources and a particular MCS. As a first option A, the UE may elect to reduce the MCS 804 (e.g., use a lower MCS than was allocated). Alternatively, as a second option B, the UE may elect to reduce the transmission size 806 (e.g., use fewer than the allocated number of frequency resources). Alternatively, as a third option C, the UE may elect to reduce the MCS 804 and reduce the transmission size 808.

Figure 9:
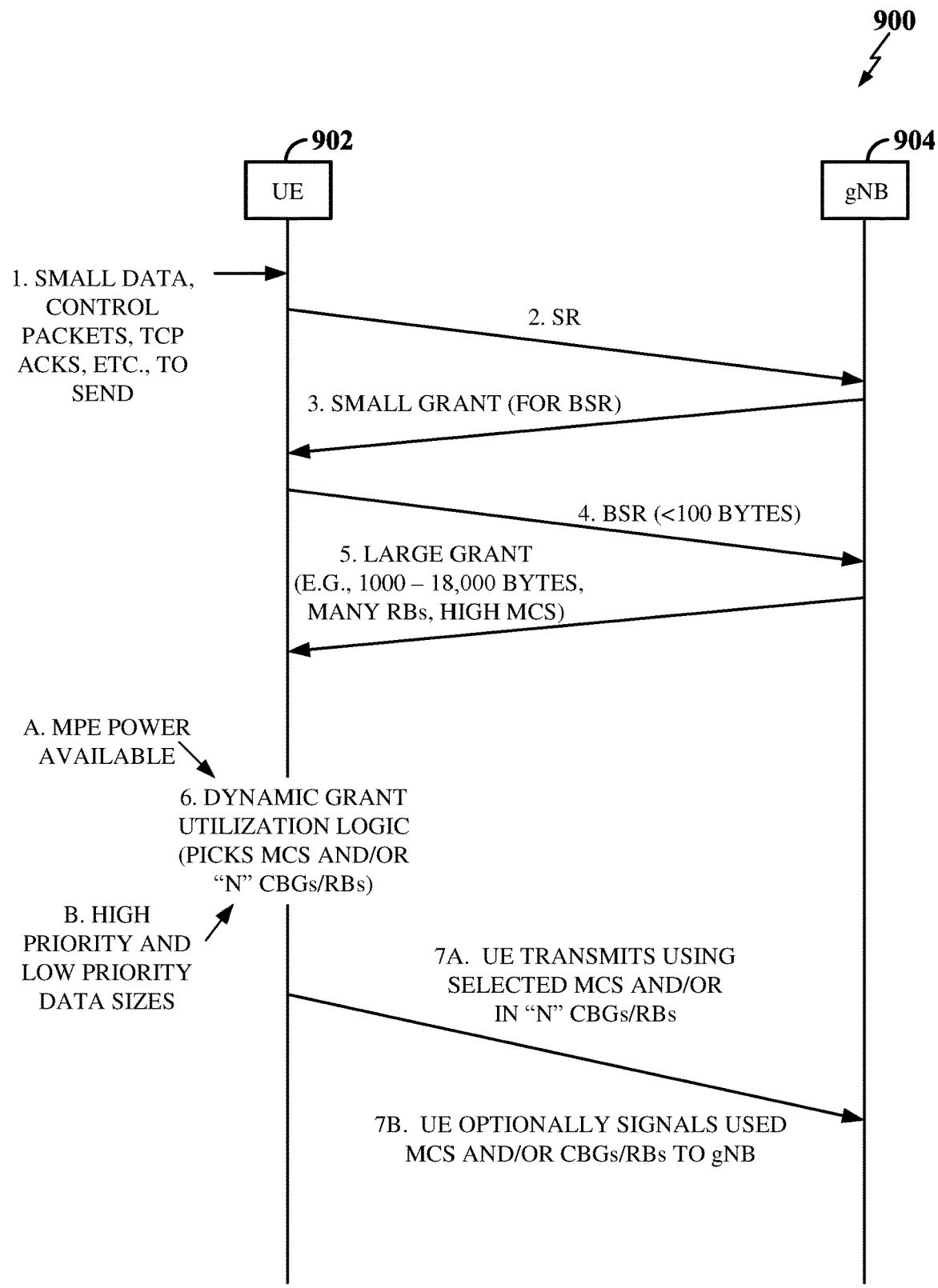
FIG. 9 is a flow chart illustrating an example of a communication process that dynamically uses grant resources according to some aspects.

FIG. 9 illustrates an example call flow 900 in a wireless communication system including a UE 902 and a gNB 904 using one or more of the techniques taught herein. In some implementations, the UE 902 may correspond to any of the UEs or scheduled entities shown in any of FIGS. 1, 2, 10, and 11. In some implementations, the gNB 904 may correspond to any of the BSs or scheduling entities shown in any of FIGS. 1, 2, 10, and 14.

At step 1 of FIG. 9, a UE has relatively small data and/or control packets (or other information that is relatively small in size) to send. At step 2, the UE sends a scheduling request (SR) to a gNB. At step 3, the gNB sends a small grant to the UE for a buffer status report (BSR). At step 4, the UE sends the BSR to the gNB. At step 5, the gNB sends a grant to the UE, where the grant allocates more resources than desired by the UE. At step 6, the UE uses dynamic grant utilization logic to select an MCS (e.g., lower than the granted MCS) and/or the number of CBGs or RBs (e.g., less than the granted number of CBGs or RBs) that the UE will use for an UL transmission. This step may optionally be based on: A) the available transmit power (e.g., MPE limited transmit power) and/or B) the sizes of high priority data and low priority data (e.g., as discussed herein). At step 7A, the UE transmits information to the gNB using the selected MCS and/or CBGs/RBs. At optional step 7B, the UE may signal to the gNB the actual MCS that the UE used for the transmission at step 7A and/or the number of CBGs/RBs that the UE used from the transmission at step 7A. As discussed herein, the transmissions of steps 7A and 7B may be combined into a signal transmission (e.g., the signaling of step 7B may be sent along with the data in step 7A).

In some aspects, a UE may achieve transmission gains through the use of the teachings herein. More efficient UL transmissions may be achieved since the UE can match its UL transmission size to the data the UE wants to send (e.g., there may be less padding to transmit). More reliable transmissions may be achieved since the UE can match its transmission parameters (such as MCS) to its available UL transmit power. Improvement in TCP downlink performance (throughput) may be achieved due to timely TCP downlink feedback (e.g., ACKs/NACKs). Improvement in BLER also may be achieved (e.g., when power is limited and there is only small amount of data to transmit). In the event of re-transmission, the gNB may be able to free up the unused resource and assign it to other UEs (e.g., up to N times the unused bandwidth may be freed for other uses using the teachings herein, where N is the maximum number of retransmissions).

In some aspects, use of the teachings herein may improve the performance of an MPE-limited UE. For example, a UE may avoid deadlock when the UE is MPE limited and cannot sent the PHR/BSR to inform the network. The teachings herein may enable more efficient use of the MPE power budget, which allows the UE the transmit for longer (e.g., through the use of a better MPE duty cycle). The teachings herein may enable more timely transmission of high priority uplink control information (UCI) since the MPE budget is used more efficiently and PUCCH and small Layer 2 (L2) control packets can still be transmitted in a portion of the UL grant. The UE can prioritize and transmit high priority traffic efficiently given MPE limits. UL transmission reliability also may be improved when a UE is power limited (e.g., MPE power limited) and the UE only wants to send a small amount of data but the UL grant is larger. In a conventional scenario, the large grant may cause the UE to append a lot of padding to the TB and spread the UE's available power across a large uplink transmission, leading to poor BLER (e.g., worse than ~10% BLER). The UE can advantageously pick a smaller and more appropriate transmission size and increase its power to improve the BLER to meet ~10% BLER. In contrast, for the case where the UE only has a small amount of data to send compared to the large UL grant or the UE wants to improve the reliability of the transmission, the UE can use the teachings herein to reduce the MCS to meet the BLER goal (e.g., ~10% BLER).

In addition, the UE may conserve battery power due to increased efficiency. For example, if the UE uses less padding, the UE may consume less battery power due to reduced transmissions.

Figure 10:
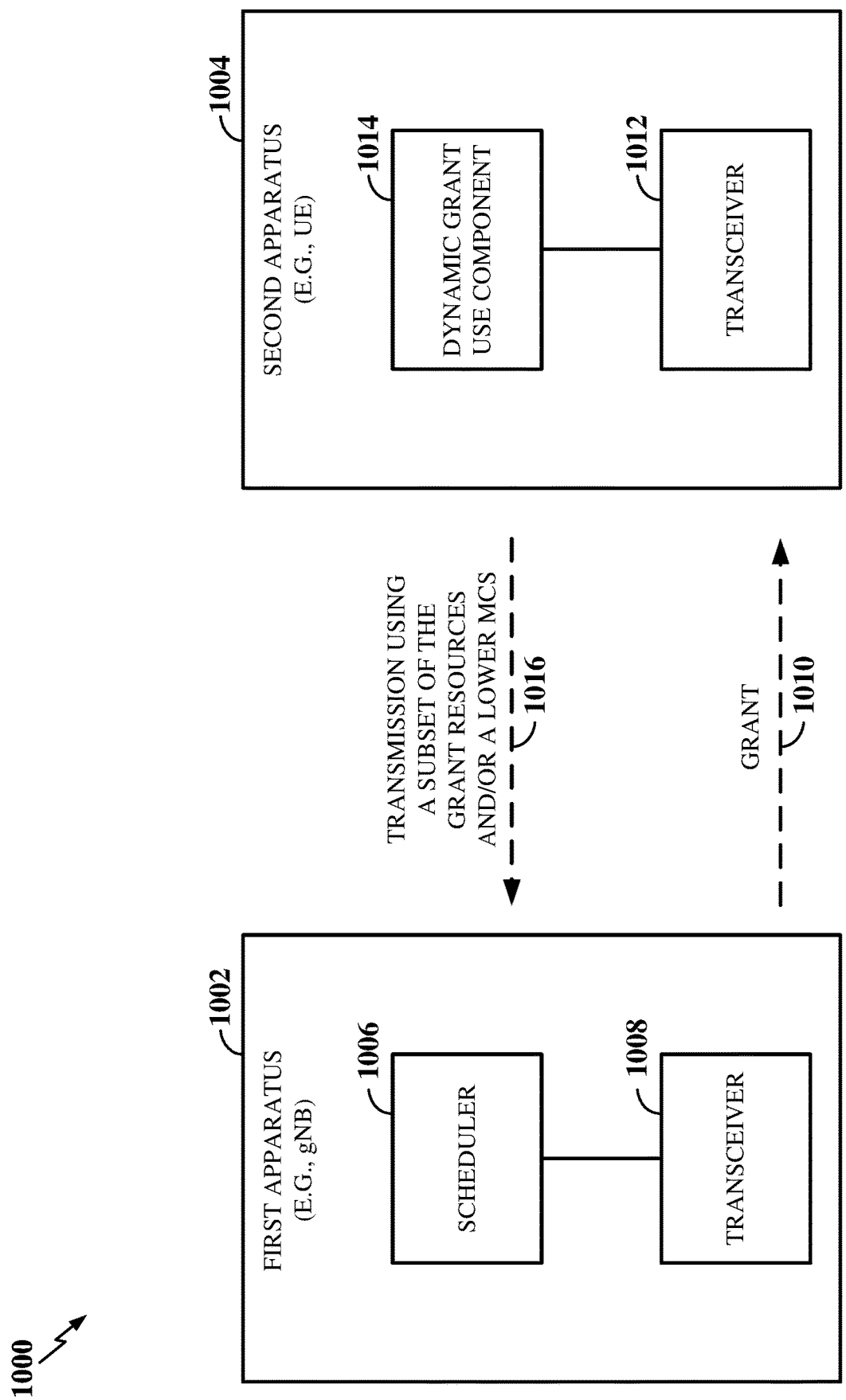
FIG. 10 is a block diagram illustrating an example communication system where an apparatus may dynamically use grant resources according to some aspects.

FIG. 10 is a schematic illustration of a wireless communication system 1000 that incorporates the teachings herein to dynamically use grants for wireless communication. The wireless communication system 1000 includes a first apparatus 1002 (e.g., a wireless communication device such as a gNB) and a second apparatus 1004 (e.g., a wireless communication device such as UE), and potentially other apparatuses (not shown). In some implementations, the first apparatus 1002 may correspond to any of the BSs or scheduling entities shown in any of FIGS. 1, 2, 9, and 14. In some implementations, the second apparatus 1004 may correspond to any of the UEs or scheduled entities shown in any of FIGS. 1, 2, 9, and 11.

The first apparatus 1002 includes a scheduler 1006 for generating a schedule for communicating with the second apparatus 1004 and/or other apparatuses. To this end, the first apparatus 1002 may send a grant 1010 to the second apparatus 1004 via a transceiver 1008. The grant 1010 may identify one or more resources and/or an MCS that the second apparatus 1004 may use for a transmission (e.g., an UL transmission).

The second apparatus 1004 includes a transceiver 1012 for receiving the grant 1010, and other information. The second apparatus 1004 also includes a dynamic grant use component 1014 for dynamically determining which resources and/or MCS to use for a transmission. In accordance with the teachings herein, the dynamic grant use component 1014 may use the first implementation, the second implementation, the third implementation, or other techniques discussed above. Accordingly, the transceiver 1012 may send a transmission (e.g., an UL transmission) 1016 to the transceiver 1008 using a subset of the resources identified by the grant 1010 and/or using a lower MCS than was identified by the grant 1010.

The dynamic grant use component 1014 may perform various functions in accordance with the teachings herein. Several non-limiting examples follow. The dynamic grant use component 1014 may consider the uplink data available for transmission at the UE, in the various uplink bearers, with associated priority. The dynamic grant use component 1014 may select a subset or all of the bearers for transmission based on their priority, radio conditions. The dynamic grant use component 1014 may select a subset of the QOS flows mapped to the selected bearers. The dynamic grant use component 1014 may then select the minimum amount of UL grant to use to send the selected traffic.

Figure 11:
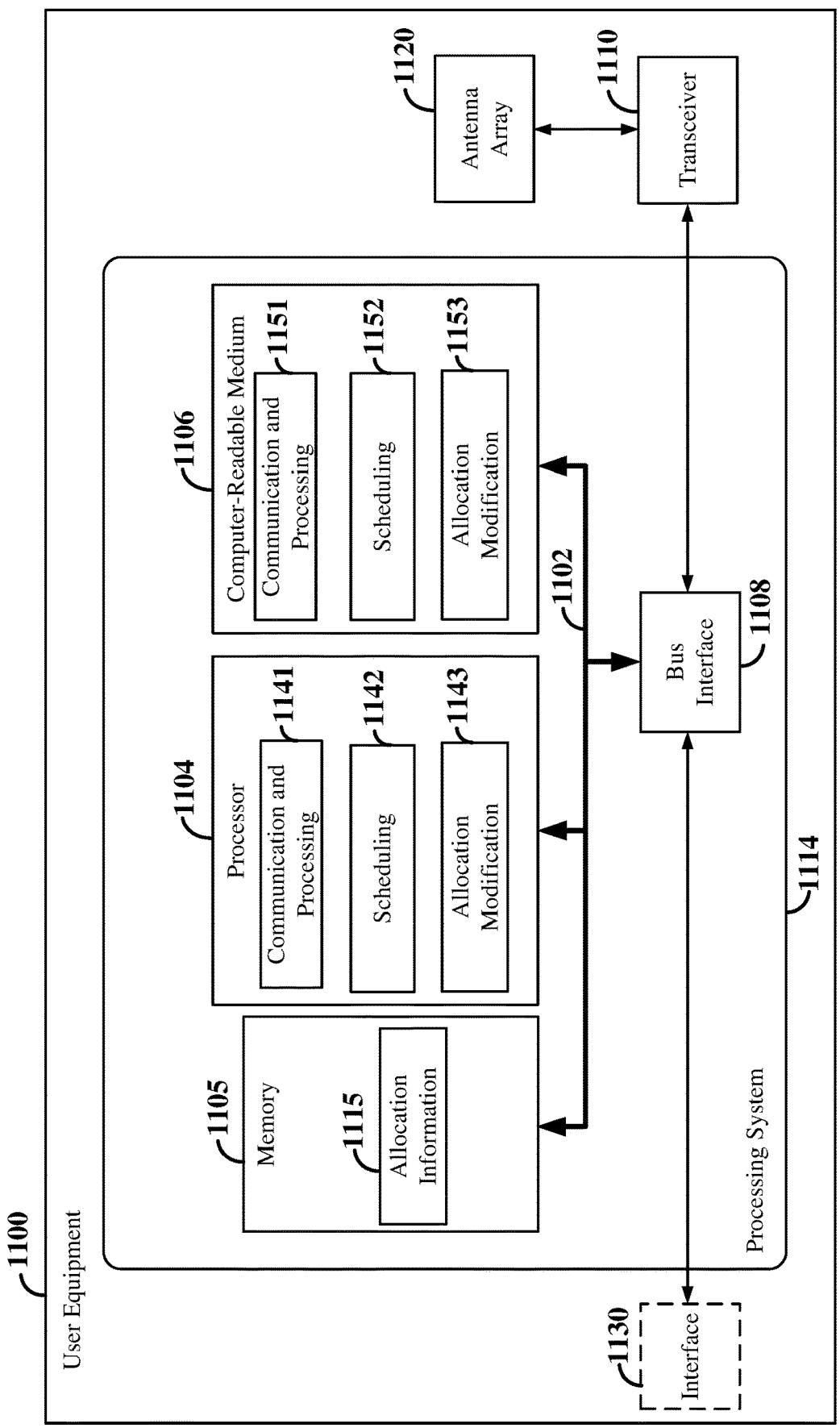
FIG. 11 is a block diagram illustrating an example of a hardware implementation for a user equipment employing a processing system according to some aspects.

FIG. 11 is a block diagram illustrating an example of a hardware implementation for a UE 1100 employing a processing system 1114. For example, the UE 1100 may be a device configured to wirelessly communicate with a base station, as discussed in any one or more of FIGS. 1-10. In some implementations, the UE 1100 may correspond to any of the UEs or scheduled entities shown in any of FIGS. 1, 2, 9, and 10.

In accordance with various aspects of the disclosure, an element, or any portion of an element, or any combination of elements may be implemented with the processing system 1114. The processing system 1114 may include one or more processors 1104. Examples of processors 1104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1100 may be configured to perform any one or more of the functions described herein. That is, the processor 1104, as utilized in a UE 1100, may be used to implement any one or more of the processes and procedures described herein.

The processor 1104 may in some instances be implemented via a baseband or modem chip and in other implementations, the processor 1104 may include a number of devices distinct and different from a baseband or modem chip (e.g., in such scenarios as may work in concert to achieve embodiments discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1114 may be implemented with a bus architecture, represented generally by the bus 1102. The bus 1102 may include any number of interconnecting buses and bridges depending on the specific application of the processing system 1114 and the overall design constraints. The bus 1102 communicatively couples together various circuits including one or more processors (represented generally by the processor 1104), a memory 1105, and computer-readable media (represented generally by the computer-readable medium 1106). The bus 1102 may also link various other circuits such as timing sources, peripherals, voltage regulators, and power management circuits, which are well known in the art, and therefore, will not be described any further. A bus interface 1108 provides an interface between the bus 1102 and a transceiver 1110 and between the bus 1102 and an interface 1130. The transceiver 1110 provides a communication interface or means for communicating with various other apparatus over a wireless transmission medium. In some examples, the UE may include two or more transceivers 1110, each configured to communicate with a respective network type (e.g., terrestrial or non-terrestrial). The interface 1130 provides a communication interface or means of communicating with various other apparatuses and devices (e.g., other devices housed within the same apparatus as the UE or other external apparatuses) over an internal bus or external transmission medium, such as an Ethernet cable. Depending upon the nature of the apparatus, the interface 1130 may include a user interface (e.g., keypad, display, speaker, microphone, joystick). Of course, such a user interface is optional, and may be omitted in some examples, such as an IoT device.

The processor 1104 is responsible for managing the bus 1102 and general processing, including the execution of software stored on the computer-readable medium 1106. The software, when executed by the processor 1104, causes the processing system 1114 to perform the various functions described below for any particular apparatus. The computer-readable medium 1106 and the memory 1105 may also be used for storing data that is manipulated by the processor 1104 when executing software. For example, the memory 1105 may store allocation information 1115 (e.g., resource and/or MCS information) used by the processor 1304 in cooperation with the transceiver 1310 for transmitting data.

One or more processors 1104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1106.

The computer-readable medium 1106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1106 may reside in the processing system 1114, external to the processing system 1114, or distributed across multiple entities including the processing system 1114. The computer-readable medium 1106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The UE 1100 may be configured to perform any one or more of the operations described herein (e.g., as described above in conjunction with FIGS. 1-10 and as described below in conjunction with FIGS. 12-13). In some aspects of the disclosure, the processor 1104, as utilized in the UE 1100, may include circuitry configured for various functions.

The processor 1104 may include communication and processing circuitry 1141. The communication and processing circuitry 1141 may be configured to communicate with a base station, such as a gNB. The communication and processing circuitry 1141 may include one or more hardware components that provide the physical structure that performs various processes related to wireless communication (e.g., signal reception and/or signal transmission) as described herein. The communication and processing circuitry 1141 may further include one or more hardware components that provide the physical structure that performs various processes related to signal processing (e.g., processing a received signal and/or processing a signal for transmission) as described herein. In some examples, the communication and processing circuitry 1141 may include two or more transmit/receive chains, each configured to process signals in a different RAT (or RAN) type. The communication and processing circuitry 1141 may further be configured to execute communication and processing software 1151 included on the computer-readable medium 1106 to implement one or more functions described herein.

In some examples, the communication and processing circuitry 1141 may be configured to receive and process downlink beamformed signals at a mmWave frequency or a sub-6 GHz frequency via the transceiver 1110 and an antenna array 1120. For example, the communication and processing circuitry 1141 may be configured to receive a respective reference signal (e.g., SSB or CSI-RS) on each of a plurality of downlink beams from the base station during a downlink beam sweep via at least one first antenna panel of the antenna array 1120. The communication and processing circuitry 1141 may further be configured to transmit a beam measurement report to the base station.

In some examples, the communication and processing circuitry 1141 may further be configured to generate and transmit uplink beamformed signals at a mmWave frequency or a sub-6 GHz frequency via the transceiver 1110 and the antenna array 1120. For example, the communication and processing circuitry 1141 may be configured to transmit a respective reference signal (e.g., SRS or DMRS) on each of a plurality of uplink beams to the base station during an uplink beam sweep via at least one second antenna panel of the antenna array 1120.

The communication and processing circuitry 1141 may further be configured to generate and transmit a request to the base station. For example, the request may be included in a MAC-CE carried in a PUSCH, UCI in a PUCCH or PUSCH, a random access message, or an RRC message. The communication and processing circuitry 1141 may further be configured to generate and transmit a scheduling request (e.g., via UCI in a PUCCH) to the base station to receive an uplink grant for the PUSCH carrying the MAC-CE including the request.

The communication and processing circuitry 1141 may further be configured to generate and transmit an uplink signal on one or more uplink transmit beams applied to the uplink signal. The uplink signal may include, for example, a PUCCH, PUSCH, SRS, DMRS, or PRACH.

The communication and processing circuitry 1141 may further be configured to control the antenna array 1120 and the transceiver 1110 to search for and identify a plurality of downlink transmit beams during a downlink beam sweep. The communication and processing circuitry 1141 may further be configured to obtain a plurality of beam measurements on each of a plurality of downlink receive beams via the antenna array 1120 for each of the identified downlink transmit beams. The communication and processing circuitry 1141 may further be configured to generate a beam measurement report for transmission to the base station using the communication and processing circuitry 1141.

The communication and processing circuitry 1141 may further be configured to identify one or more selected uplink beam(s) based on the beam measurements obtained from the downlink beam reference signals. In some examples, the communication and processing circuitry 1141 may be configured to compare the respective RSRP (or other beam measurement) measured on each of the downlink receive beams for each of the serving downlink transmit beams to identify the serving downlink receive beams and to further utilize the serving downlink receive beams as the selected uplink transmit beams. Each serving downlink receive beam may have the highest measured RSRP (or other beam measurement) for one of the downlink transmit beams.

The communication and processing circuitry 1141 may be configured to generate one or more uplink transmit beams for transmission in an uplink beam sweep. Each uplink transmit beam may carry an uplink reference signal (e.g., an SRS) for measurement by the base station. The communication and processing circuitry 1141 may further be configured to identify the selected uplink transmit beam(s) selected by the base station based on the uplink beam measurements. For example, the communication and processing circuitry 1141 may be configured to receive an indication of the selected uplink transmit beam(s) from the base station.

In some implementations where the communication involves receiving information, the communication and processing circuitry 1141 may obtain information from a component of the UE 1100 (e.g., from the transceiver 1110 that receives the information via radio frequency signaling or some other type of signaling suitable for the applicable communication medium), process (e.g., decode) the information, and output the processed information. For example, the communication and processing circuitry 1141 may output the information to another component of the processor 1104, to the memory 1105, or to the bus interface 1108. In some examples, the communication and processing circuitry 1141 may receive one or more of signals, messages, other information, or any combination thereof. In some examples, the communication and processing circuitry 1141 may receive information via one or more channels. In some examples, the communication and processing circuitry 1141 may include functionality for a means for receiving. In some examples, the communication and processing circuitry 1141 may include functionality for a means for decoding.

In some implementations where the communication involves sending (e.g., transmitting) information, the communication and processing circuitry 1141 may obtain information (e.g., from another component of the processor 1104, the memory 1105, or the bus interface 1108), process (e.g., encode) the information, and output the processed information. For example, the communication and processing circuitry 1141 may output the information to the transceiver 1110 (e.g., that transmits the information via radio frequency signaling or some other type of signaling suitable for the applicable communication medium). In some examples, the communication and processing circuitry 1141 may send one or more of signals, messages, other information, or any combination thereof. In some examples, the communication and processing circuitry 1141 may send information via one or more channels. In some examples, the communication and processing circuitry 1141 may include functionality for a means for sending (e.g., a means for transmitting). In some examples, the communication and processing circuitry 1141 may include functionality for a means for encoding.

The processor 1104 may include scheduling circuitry 1142 configured to perform scheduling-related operations as discussed herein (e.g., one or more of the operations described in conjunction with FIGS. 4-10). For example, the scheduling circuitry 1142 may include functionality for receiving and processing a grant. The scheduling circuitry 1142 may include functionality for a means for receiving a grant (e.g., as described at step 5 of FIG. 9 and/or for the grant 1010 of FIG. 10 and/or at block 1202 of FIG. 12 and/or at block 1302 of FIG. 13). The scheduling circuitry 1142 may further be configured to execute scheduling software 1152 included on the computer-readable medium 1106 to implement one or more functions described herein.

The processor 1104 may include allocation modification circuitry 1143 configured to perform allocation modification-related operations as discussed herein (e.g., one or more of the operations described in conjunction with FIGS. 4-10). For example, the allocation modification circuitry 1143 may include functionality for selecting a subset of an allocation and/or selecting an MCS. The allocation modification circuitry 1143 may include functionality for a means for selecting an allocation (e.g., as described at step 6 of FIG. 9 and/or for the dynamic grant use component 1014 of FIG. 10 and/or at block 1204 of FIG. 12). The allocation modification circuitry 1143 may include functionality for a means for sending information via an allocation (e.g., as described at step 7A of FIG. 9 and/or for the transmission 1016 of FIG. 10 and/or at block 1206 of FIG. 12). The allocation modification circuitry 1143 may include functionality for a means for selecting an MCS (e.g., as described at step 6 of FIG. 9 and/or for the dynamic grant use component 1014 of FIG. 10 and/or at block 1304 of FIG. 13). The allocation modification circuitry 1143 may include functionality for a means for sending information using an MCS (e.g., as described at step 7A of FIG. 9 and/or for the transmission 1016 of FIG. 10 and/or at block 1306 of FIG. 13). The allocation modification circuitry 1143 may include the functionality of the dynamic grant use component 1014 of FIG. 10. The allocation modification circuitry 1143 may further be configured to execute allocation modification software 1153 included on the computer-readable medium 1106 to implement one or more functions described herein.

Figure 12:
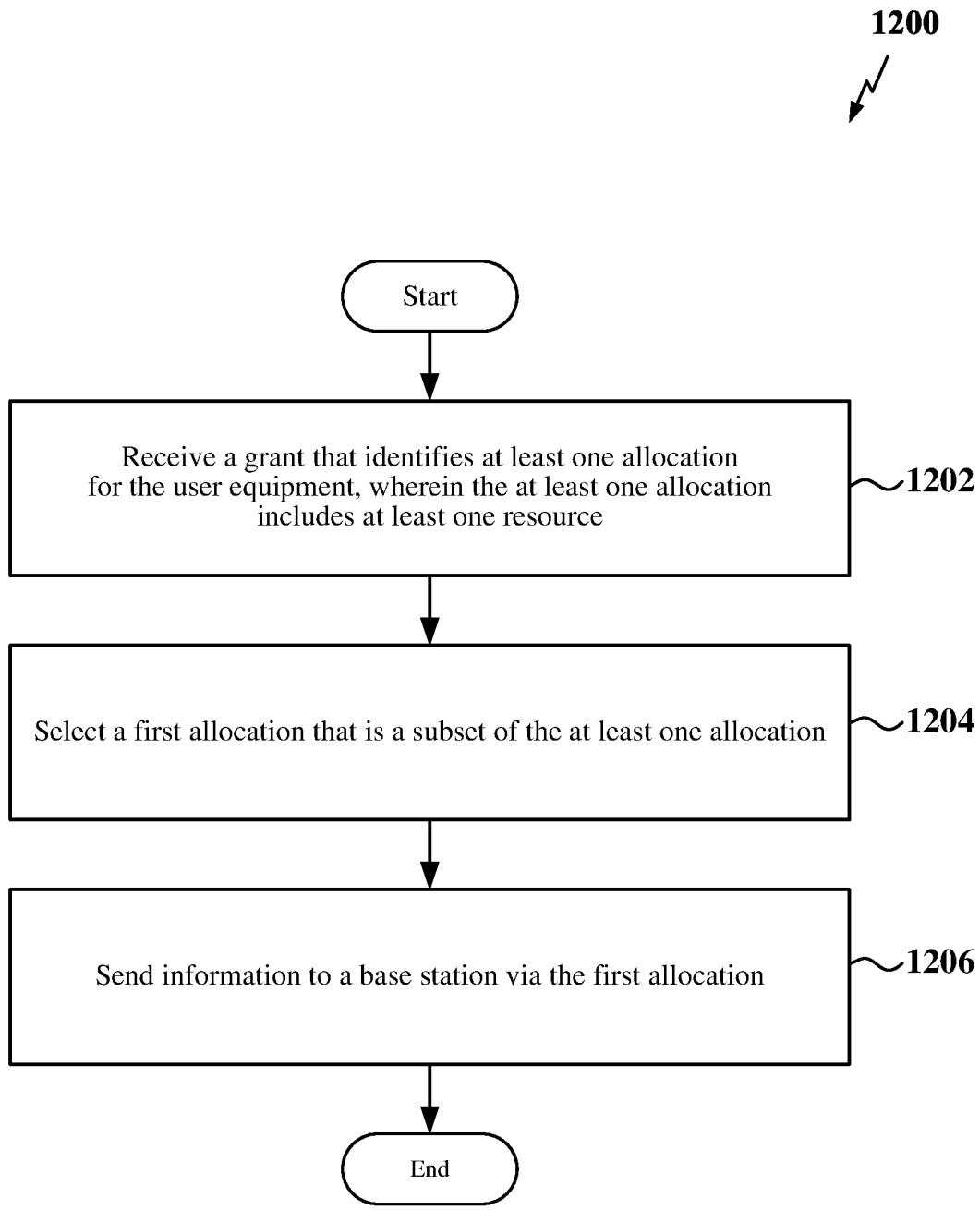
FIG. 12 is a flow chart of an example process for dynamically using grant resources according to some aspects.

FIG. 12 is a flow chart illustrating an example process 1200 for a wireless communication system in accordance with some aspects of the present disclosure. As described below, some or all illustrated features may be omitted in a particular implementation within the scope of the present disclosure, and some illustrated features may not be required for implementation of all embodiments. In some examples, the process 1200 may be carried out by the UE 1100 illustrated in FIG. 11. In some examples, the process 1200 may be carried out by any suitable apparatus or means for carrying out the functions or algorithm described below.

At block 1202, a UE may receive a grant that identifies at least one allocation for the user equipment. For example, the scheduling circuitry 1142 together with the communication and processing circuitry 1141 and the transceiver 1110, shown and described above in connection with FIG. 11, may monitor a downlink control channel (e.g., a PDCCH) on a designated resource and decode any messages (e.g., DCI) that are transmitted on that channel. The scheduling circuitry 1142 may then parse the received message to obtain any scheduling information included in the message.

The at least one allocation may include at least one resource. In some examples, the at least one resource may include at least one of a code block group (CBG), a resource block (RB), a resource block group (RBG), or a combination thereof.

At block 1204, the UE may select a first allocation that is a subset of the at least one allocation. For example, the allocation modification circuitry 1143, shown and described above in connection with FIG. 11, may determine that the UE has less data to send than was allocated by the grant. The allocation modification circuitry 1143 may then select a portion of the original allocation that better matches the amount of data to be sent.

At block 1206, the UE may send information to a base station via the first allocation. For example, the allocation modification circuitry 1143 together with the communication and processing circuitry 1141 and the transceiver 1110 may generate at least one data block (e.g., at least one code block) and transmit the at least one data block to a gNB via an uplink channel (e.g., PUSCH) on a designated resource according to the newly selected allocation.

In some examples, the at least one resource may include at least one code block. In some examples, the process may further include sending at least one indication that specifies a quantity (the number) of the at least one code block in the subset (e.g., the at least one indication specifies how many code blocks are in the selected first allocation). In some examples, the process may further include sending at least one indication that specifies at least one position of the at least one code block in the subset.

In some examples, sending of the information may include applying puncturing to the at least one resource. In some examples, the subset may include a first subset of the at least one resource; and the puncturing is applied to a second subset of the at least one resource that is different from the first subset. In some examples, the grant is for an uplink transmission, and the puncturing is applied to a physical uplink shared channel (PUSCH).

In some examples, the process may further include determining that the information can be sent using less than the at least one resource. In this case, the selecting of the allocation may be triggered based on the determination.

In some examples, the process may further include determining a minimum number of resources to send the information. In this case, the selecting of the allocation may be based on the determination of the minimum number of resources.

In some examples, the process may further include sending at least one indication of the selection (selecting) of the first allocation to the base station. The at least one indication may take different forms in different implementations. In some examples, the at least one indication indicates that the user equipment used only a portion of the at least one resource to send the information. In some examples, the at least one indication indicates a quantity of resources that the user equipment used to send the information. In some examples, the at least one indication indicates that the user equipment used a lower MCS than the at least one MCS to send the information. In some examples, the at least one indication identifies an MCS value that the user equipment used to send the information. In some examples, the at least one indication may specify at least one of a quantity of code block groups (CBGs), a quantity of resource blocks (RBs), a quantity of resource block groups (RBGs), or any combination thereof.

In some examples, the at least one indication is sent via a data block. This may, for example, enable the indication to be sent more efficiently (e.g., instead of using separate control signaling resources to send the indication). In some examples, the at least one indication indicates whether the data block is used by the user equipment to send the information. In some examples, the at least one indication is sent at a beginning of the data block. In some examples, the at least one indication is sent at an end of the data block.

In some examples, the at least one indication is sent via a subset of the at least one resource. In some examples, the at least one indication is sent via a first portion of the subset that precedes a second portion of the subset that carries the information. In some examples, the at least one indication may be a demodulation reference signal (DMRS). In some examples, the DMRS is sent via a subset of the at least one resource.

The use of such an indication may enable the base station to efficiently determine that all of an allocation is being (or has been) used for sending information. The use of such an indication may enable the base station to determine which subset of an allocation (e.g., a portion of resources and/or a lower MCS) is actually being (or has actually been) used for sending information.

In some examples, the information is sent via a transport block including a media access control (MAC) header. In addition, the at least one indication may be sent via the transport block and external to the MAC header.

In some examples, the grant is for an uplink transmission; and the at least one indication is sent via uplink control information. In some examples, the grant is for an uplink transmission; and the at least one indication is sent via a physical uplink control channel (PUCCH).

The process may include one or more other operations in some implementations. In some examples, the process may further include determining that the information can be sent using less than the at least one resource, wherein the selecting of the allocation is triggered based on the determination. In some examples, the process may further include determining that transmit power of the user equipment is limited, wherein the selecting of the allocation is triggered based on the determination. In some examples, the process may further include determining that a lower MCS than the at least one MCS should be used for sending the information, wherein the selecting of the allocation is triggered based on the determination. In some examples, the process may further include receiving another indication that the user equipment is allowed to select an allocation, wherein the selecting of the allocation is triggered based on the receipt of the other indication. In some examples, the process may further include sending a request to select an allocation, wherein the other indication is received after the request is sent. In some examples, the process may further include determining a transmit power for a transmission based on the selected allocation and a transmit power constraint. In some examples, the transmit power constraint may include a maximum permissible exposure (MPE) limit.

In some examples, the process may further include accessing an MCS table (e.g., an agreed upon MCS table). In some examples, the process may further include using a subset of the MCS table for the selecting of the allocation.

Figure 13:
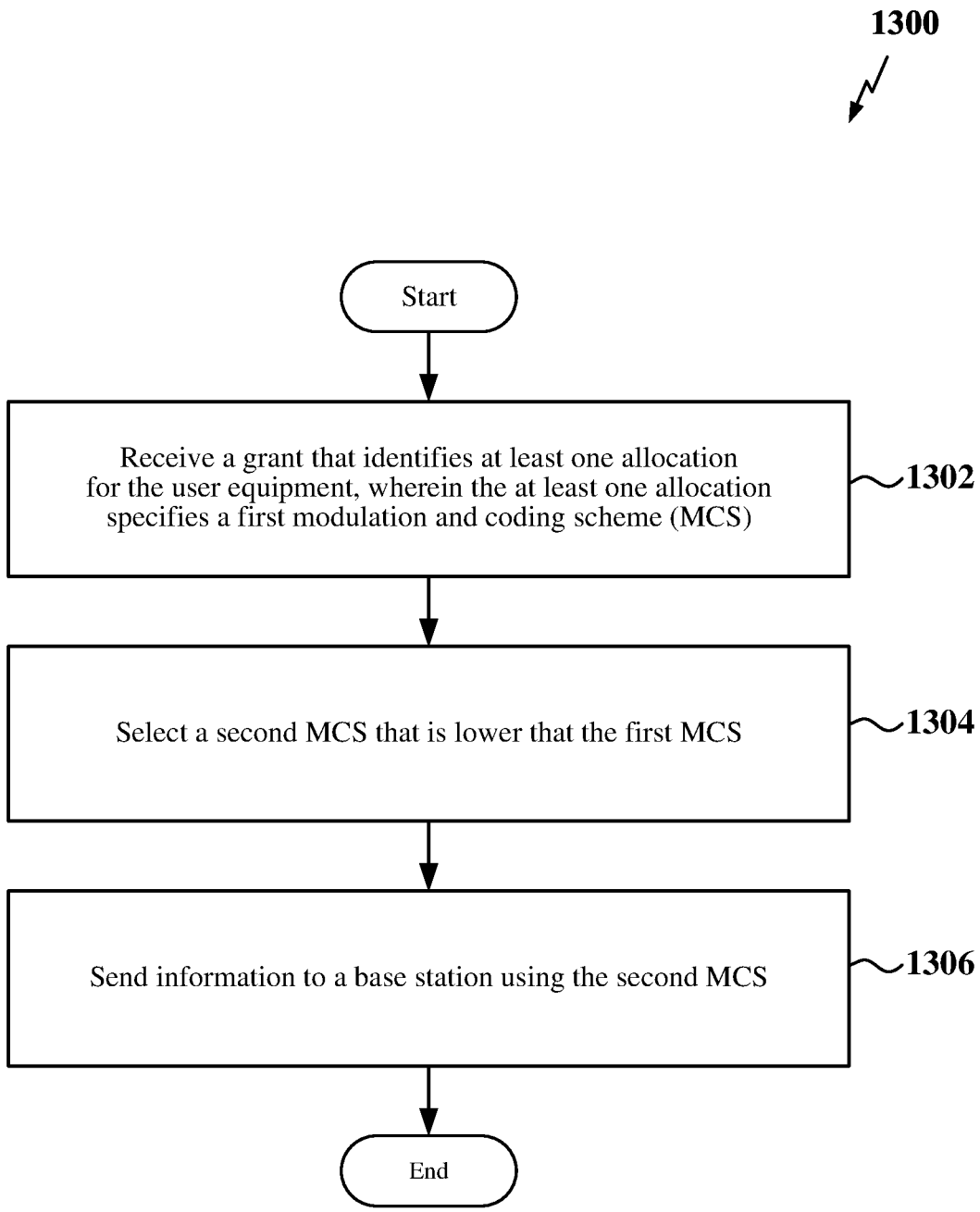
FIG. 13 is a flow chart of another example process for dynamically using grant resources according to some aspects.

FIG. 13 is a flow chart illustrating an example process 1300 for a wireless communication system in accordance with some aspects of the present disclosure. As described below, some or all illustrated features may be omitted in a particular implementation within the scope of the present disclosure, and some illustrated features may not be required for implementation of all embodiments. In some examples, the process 1300 may be carried out by the UE 1100 illustrated in FIG. 11. In some examples, the process 1300 may be carried out by any suitable apparatus or means for carrying out the functions or algorithm described below.

At block 1302, a UE may receive a grant that identifies at least one allocation for the user equipment, wherein the at least one allocation specifies a first modulation and coding scheme (MCS). For example, the scheduling circuitry 1142 together with the communication and processing circuitry 1141 and the transceiver 1110, shown and described above in connection with FIG. 11, may monitor a downlink control channel (e.g., a PDCCH) on a designated resource and decode any messages (e.g., DCI) that are transmitted on that channel. The scheduling circuitry 1142 may then parse the received message to obtain any scheduling information included in the message.

At block 1304, the UE may select a second MCS that is lower that the first MCS. For example, the allocation modification circuitry 1143, shown and described above in connection with FIG. 11, may determine that the UE has less data to send than was allocated by the grant. The allocation modification circuitry 1143 may then select a different MCS that better matches the amount of data to be sent.

At block 1306, the UE may send information to a base station using the second MCS. For example, the allocation modification circuitry 1143 together with the communication and processing circuitry 1141 and the transceiver 1110 may generate at least one data block (e.g., at least one code block) and transmit the at least one data block to a gNB via an uplink channel (e.g., PUSCH) on a designated resource according to the newly selected MCS.

In some examples, the process may further include determining that a lower MCS than the first MCS should be used for sending the information. In this case, the selecting of the second MCS may be triggered based on the determination.

In some examples, the process may further include accessing an MCS table. In some examples, the process may further include using a subset of the MCS table for the selecting of the second MCS.

In some examples, the process may further include sending at least one indication specifying that the user equipment used a lower MCS than the first MCS to send the information. In some examples, the process may further include sending at least one indication specifying a value of the second MCS.

Figure 14:
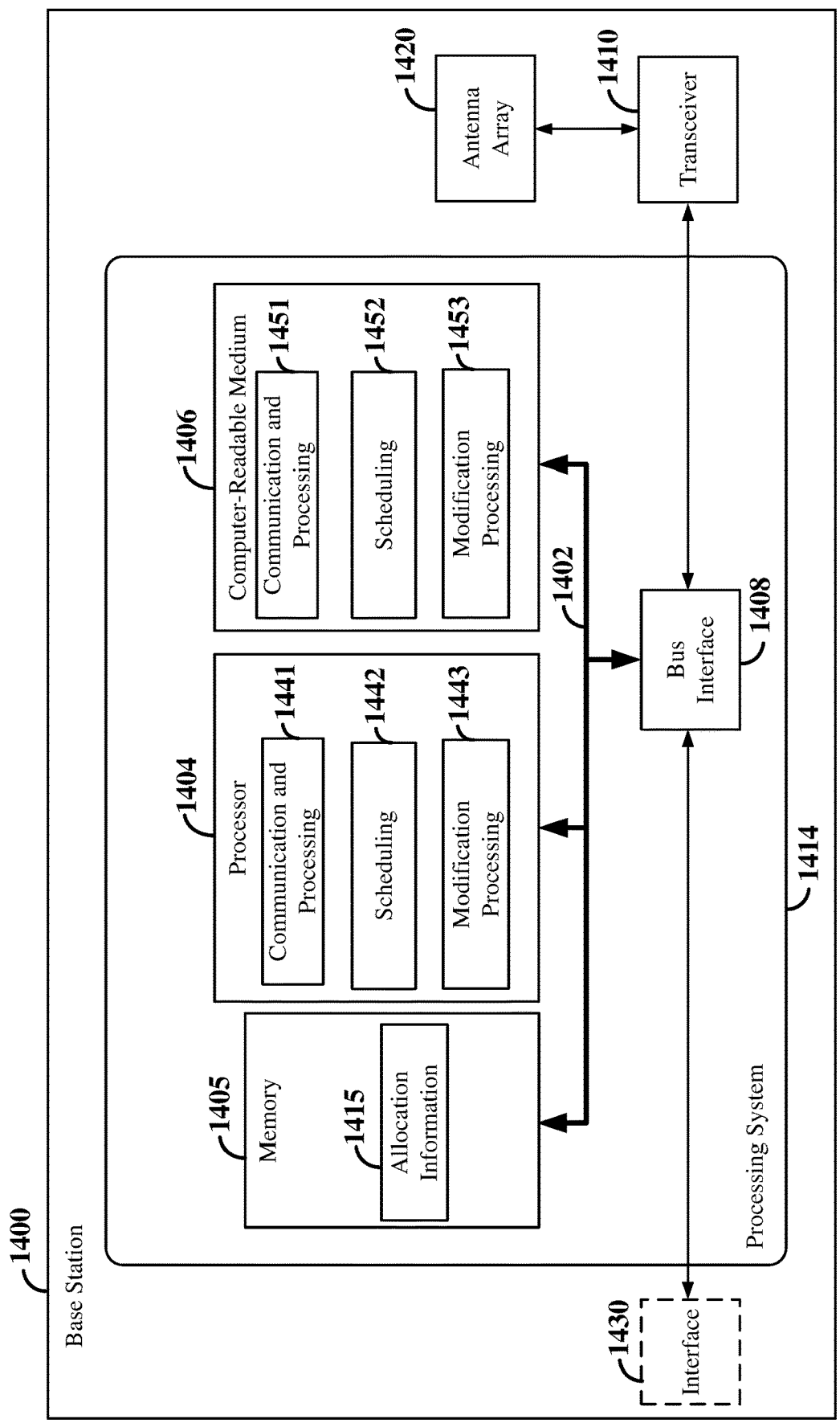
FIG. 14 is a block diagram illustrating an example of a hardware implementation for a base station employing a processing system according to some aspects.

FIG. 14 is a conceptual diagram illustrating an example of a hardware implementation for base station (BS) 1400 employing a processing system 1414. In some implementations, the BS 1400 may correspond to any of the BSs (e.g., gNBs) or scheduling entities shown in any of FIGS. 1, 2, 9, and 10.

In accordance with various aspects of the disclosure, an element, or any portion of an element, or any combination of elements may be implemented with the processing system 1414. The processing system may include one or more processors 1404. The processing system 1414 may be substantially the same as the processing system 1114 illustrated in FIG. 11, including a bus interface 1408, a bus 1402, memory 1405, a processor 1404, and a computer-readable medium 1406. The memory 1405 may store allocation information 1415 (e.g., resource and/or MCS information) used by the processor 1504 in cooperation with the transceiver 1510 for scheduling a UE. Furthermore, the BS 1400 may include an interface 1430 (e.g., a network interface) that provides a means for communicating with at least one other apparatus within a core network and with at least one radio access network.

The BS 1400 may be configured to perform any one or more of the operations described herein (e.g., as described above in conjunction with FIGS. 1-10 and as described below in conjunction with FIGS. 15-16). In some aspects of the disclosure, the processor 1404, as utilized in the BS 1400, may include circuitry configured for various functions.

The processor 1404 may be configured to generate, schedule, and modify a resource assignment or grant of time-frequency resources (e.g., a set of one or more resource elements). For example, the processor 1404 may schedule time-frequency resources within a plurality of time division duplex (TDD) and/or frequency division duplex (FDD) subframes, slots, and/or mini-slots to carry user data traffic and/or control information to and/or from multiple UEs.

The processor 1404 may be configured to schedule resources for the transmission of downlink reference signals (e.g., SSBs or CSI-RSs) on a plurality of downlink beams for a downlink beam sweep in accordance with a selected downlink beam sweep type and selected number of downlink reference signal resources indicated in a request for uplink beam refinement received from a UE. The processor 1404 may further be configured to schedule resources for the uplink transmission of uplink reference signals (e.g., SRSs) on a plurality of uplink beams for an uplink beam sweep in accordance with a selected beam sweep type and selected number of uplink reference signal resources indicated in the request. The processor 1404 may further be configured to schedule resources that may be utilized by the UE to transmit the request. For example, the uplink beam refinement request resources may include resources scheduled for transmission of a PUCCH, PUSCH, PRACH occasion or RRC message. In some examples, the processor 1404 may be configured to schedule PUSCH resources for the uplink beam refinement request in response to receiving a scheduling request from the UE.

The processor 1404 may further be configured to schedule resources for the transmission of an uplink signal. In some examples, the resources may be associated with one or more uplink transmit beams and one or more corresponding receive beams applied to the uplink signal (e.g., based on the uplink BPLs) based on an indication of the uplink signal associated with the one or more uplink transmit beams included in the request. In some examples, the resources may be associated with an uplink transmission scheme indicating a number of uplink transmit beams to be utilized for the uplink signal, a number of repetitions per uplink transmit beam of the uplink signal, and a multiplexing scheme when more than one uplink transmit beam is used to transmit the uplink signal.

In some aspects of the disclosure, the processor 1404 may include communication and processing circuitry 1441. The communication and processing circuitry 1444 may be configured to communicate with a UE. The communication and processing circuitry 1441 may include one or more hardware components that provide the physical structure that performs various processes related to communication (e.g., signal reception and/or signal transmission) as described herein. The communication and processing circuitry 1441 may further include one or more hardware components that provide the physical structure that performs various processes related to signal processing (e.g., processing a received signal and/or processing a signal for transmission) as described herein. The communication and processing circuitry 1441 may further be configured to execute communication and processing software 1451 included on the computer-readable medium 1406 to implement one or more functions described herein.

In some examples, the communication and processing circuitry 1441 may be configured to receive and process uplink beamformed signals at a mmWave frequency or a sub-6 GHz frequency via the transceiver 1410 and an antenna array 1420. For example, the communication and processing circuitry 1441 may be configured to receive a respective reference signal (e.g., SRS or DMRS) on each of a plurality of uplink beams from the UE during an uplink beam sweep.

In some examples, the communication and processing circuitry 1441 may further be configured to generate and transmit downlink beamformed signals at a mmWave frequency or a sub-6 GHz frequency via the transceiver 1410 and the antenna array 1420. For example, the communication and processing circuitry 1441 may be configured to transmit a respective downlink reference signal (e.g., SSB or CSI-RS) on each of a plurality of downlink beams to the UE during a downlink beam sweep via at least one first antenna panel of the antenna array 1420. The communication and processing circuitry 1441 may further be configured to receive a beam measurement report from the UE.

The communication and processing circuitry 1441 may further be configured to receive a request from the UE. For example, the request may be included in a MAC-CE carried in a PUSCH, UCI in a PUCCH or PUSCH, a random access message, or an RRC message. The communication and processing circuitry 1441 may further be configured to receive a scheduling request (e.g., via UCI in a PUCCH) from the UE for an uplink grant for the PUSCH.

The communication and processing circuitry 1441 may further be configured to receive an uplink signal on one or more uplink receive beams via one or more uplink transmit beams applied to the uplink signal. For example, the communication and processing circuitry 1441 may be configured to receive the uplink signal on one or more uplink receive beams via at least one second antenna panel of the antenna array 1420. The uplink signal may include, for example, a PUCCH, PUSCH, SRS, DMRS, or PRACH.

The communication and processing circuitry 1441 may further be configured to control the antenna array 1420 and transceiver 1410 to generate a plurality of downlink transmit beams during a downlink beam sweep. The communication and processing circuitry 1441 may further be configured to receive a beam measurement report from the UE using the communication and processing circuitry 1444. The communication and processing circuitry 1441 may further be configured to identify one or more selected uplink beam(s) based on the beam measurements. In some examples, the communication and processing circuitry 1441 may be configured to compare the respective RSRP (or other beam measurement) measured on each of the downlink receive beams for each of the serving downlink transmit beams to identify the serving downlink receive beams and to further identify the serving downlink receive beams as the selected uplink transmit beams. Each serving downlink receive beam may have the highest measured RSRP (or other beam measurement) for one of the downlink transmit beams.

The communication and processing circuitry 1441 may be configured to receive one or more uplink transmit beams in an uplink beam sweep. Each uplink transmit beam may carry an uplink reference signal (e.g., an SRS) for measurement by the communication and processing circuitry 1441. The communication and processing circuitry 1441 may further be configured to obtain a plurality of beam measurements on each of a plurality of uplink receive beams of the antenna array 1420 for each of the uplink transmit beams. The communication and processing circuitry 1441 may further be configured to select the selected uplink transmit beam(s) and corresponding uplink receive beams forming respective uplink BPLs based on the uplink beam measurements.

In some implementations wherein the communication involves receiving information, the communication and processing circuitry 1441 may obtain information from a component of the BS 1400 (e.g., from the transceiver 1410 that receives the information via radio frequency signaling or some other type of signaling suitable for the applicable communication medium), process (e.g., decode) the information, and output the processed information. For example, the communication and processing circuitry 1441 may output the information to another component of the processor 1404, to the memory 1405, or to the bus interface 1408. In some examples, the communication and processing circuitry 1441 may receive one or more of signals, messages, other information, or any combination thereof. In some examples, the communication and processing circuitry 1441 may receive information via one or more channels. In some examples, the communication and processing circuitry 1441 may include functionality for a means for receiving. In some examples, the communication and processing circuitry 1441 may include functionality for a means for decoding.

In some implementations wherein the communication involves sending (e.g., transmitting) information, the communication and processing circuitry 1441 may obtain information (e.g., from another component of the processor 1404, the memory 1405, or the bus interface 1408), process (e.g., encode) the information, and output the processed information. For example, the communication and processing circuitry 1441 may output the information to the transceiver 1410 (e.g., that transmits the information via radio frequency signaling or some other type of signaling suitable for the applicable communication medium). In some examples, the communication and processing circuitry 1441 may send one or more of signals, messages, other information, or any combination thereof. In some examples, the communication and processing circuitry 1441 may send information via one or more channels. In some examples, the communication and processing circuitry 1441 may include functionality for a means for sending (e.g., a means for transmitting). In some examples, the communication and processing circuitry 1441 may include functionality for a means for encoding.

The processor 1404 may include scheduling circuitry 1442 configured to perform scheduling-related operations as discussed herein (e.g., one or more of the operations described in conjunction with FIGS. 4-10). For example, the scheduling circuitry 1442 may include functionality to schedule an allocation for a UE and generate a grant that identifies the allocation. The scheduling circuitry 1442 may include functionality for a means for sending a grant (e.g., as described at step 5 of FIG. 9 and/or for the grant 1010 of FIG. 10 and/or at block 1502 of FIG. 15 and/or at block 1602 of FIG. 16). The scheduling circuitry 1442 may include the functionality of the scheduler 1006 of FIG. 10. The scheduling circuitry 1442 may further be configured to execute scheduling software 1452 included on the computer-readable medium 1406 to implement one or more functions described herein.

The processor 1404 may include modification processing circuitry 1443 configured to perform modification processing-related operations as discussed herein (e.g., one or more of the operations described in conjunction with FIGS. 4-10). For example, the modification processing circuitry 1443 may include functionality to determine that a UE has selected a subset of a scheduled allocation. The modification processing circuitry 1443 may include functionality for a means for determining that a UE selected an allocation (e.g., as described at step 7B of FIG. 9 and/or at block 1504 of FIG. 15). In some examples, the modification processing circuitry 1443 may receive UCI indicating a modified allocation. In some examples, the modification processing circuitry 1443 may perform blind detection (e.g., by performing several rounds of decoding). The modification processing circuitry 1443 may include functionality for a means for receiving information via an allocation (e.g., as described at step 7A of FIG. 9 and/or for the transmission 1016 of FIG. 10 and/or at block 1506 of FIG. 15). The modification processing circuitry 1443 may include functionality for a means for determining that a UE selected an MCS (e.g., as described at step 7B of FIG. 9 and/or at block 1604 of FIG. 16). In some examples, the modification processing circuitry 1443 may receive UCI indicating a modified MCS. In some examples, the modification processing circuitry 1443 may perform blind detection (e.g., by performing several rounds of decoding). The modification processing circuitry 1443 may include functionality for a means for receiving information using an MCS (e.g., as described at step 7A of FIG. 9 and/or for the transmission 1016 of FIG. 10 and/or at block 1606 of FIG. 16). The modification processing circuitry 1443 may further be configured to execute modification processing software 1453 included on the computer-readable medium 1406 to implement one or more functions described herein.

Figure 15:
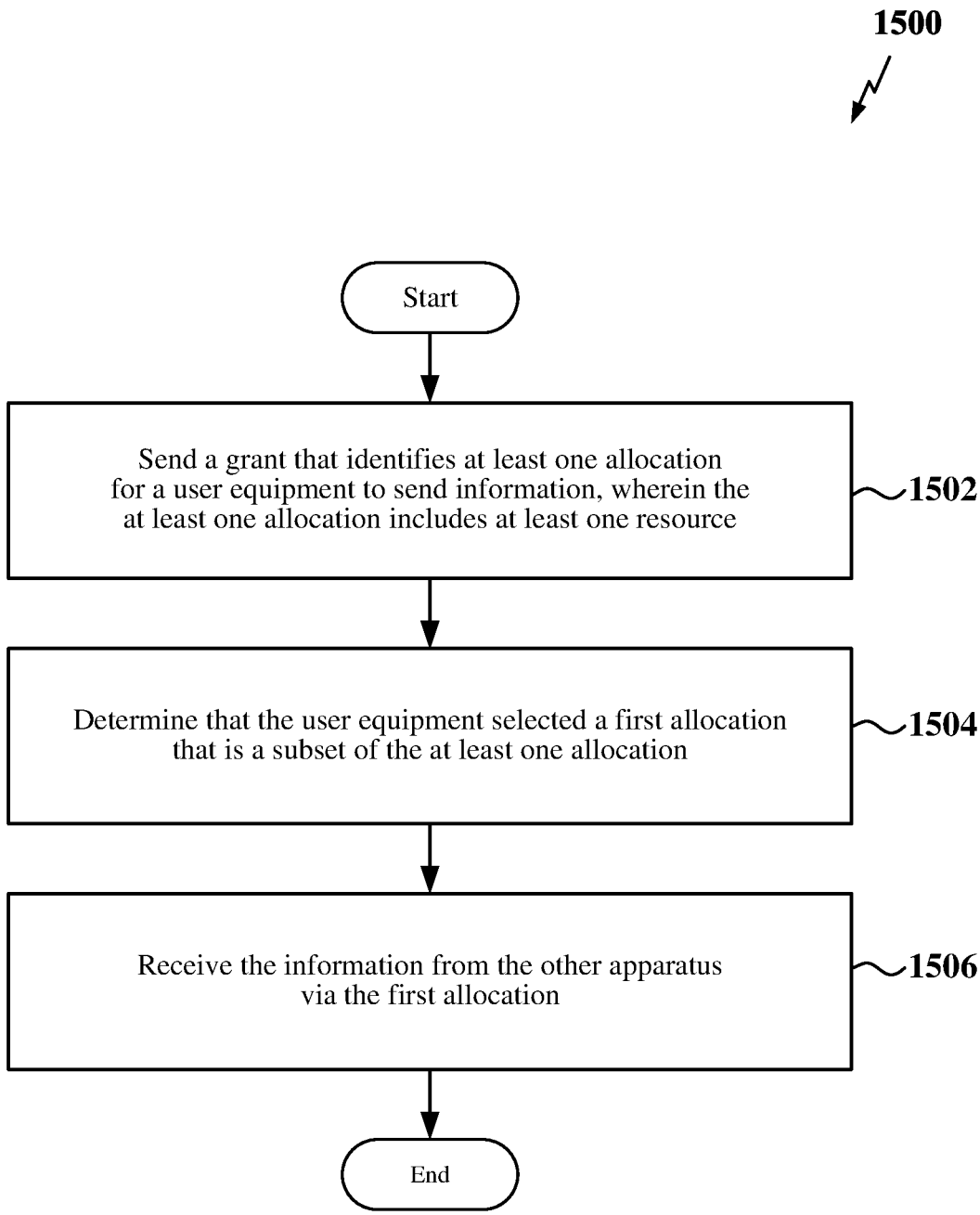
FIG. 15 is a flow chart of an example process based on dynamically used grant resources according to some aspects.

FIG. 15 is a flow chart illustrating an example process 1500 for wireless communication in accordance with some aspects of the present disclosure. As described below, some or all illustrated features may be omitted in a particular implementation within the scope of the present disclosure, and some illustrated features may not be required for implementation of all embodiments. In some examples, the process 1500 may be carried out by the BS 1400 illustrated in FIG. 14. In some examples, the process 1500 may be carried out by any suitable apparatus or means for carrying out the functions or algorithm described below.

At block 1502, a BS may send a grant that identifies at least one allocation for a user equipment to send information. For example, the scheduling circuitry 1442, shown and described above in connection with FIG. 14, may generate a grant that includes scheduling information for a UE. The scheduling circuitry 1442 together with the communication and processing circuitry 1441 and the transceiver 1410, shown and described above in connection with FIG. 14, may then transmit the grant on a downlink control channel (e.g., a PDCCH) via a resource designated for the UE.

The at least one allocation may include at least one resource. In some examples, the at least one resource may include at least one of a code block group (CBG), a resource block (RB), a resource block group (RBG), or a combination thereof.

At block 1504, the BS may determine that the user equipment selected a first allocation that is a subset of the at least one allocation. For example, the modification processing circuitry 1443 together with the communication and processing circuitry 1441 and the transceiver 1410, shown and described above in connection with FIG. 14, may compare a resource allocation specified by the grant with the resources used or to be used by the UE for a transmission to the BS via an uplink channel (e.g., PUSCH). In addition, the modification processing circuitry 1443 may identify the particular resources used or to be used by the UE for the uplink transmission.

In some examples, determining that the user equipment selected a first allocation may include determining that the other apparatus did not use all of the at least one resource to send the information. In some examples, determining that the user equipment selected a first allocation may include determining a quantity of resources that the apparatus used to send the information. In some examples, determining that the user equipment selected a first allocation may include determining that the other apparatus used a lower MCS than the at least one MCS to send the information. In some examples, determining that the user equipment selected a first allocation may include determining an MCS value that the apparatus used to send the information.

At block 1506, the BS may receive the information from the user equipment via the first allocation. For example, the modification processing circuitry 1443 together with the communication and processing circuitry 1441 and the transceiver 1410 may monitor the resources corresponding to the first allocation for an uplink transmission by the UE (e.g., on PDSCH). The modification processing circuitry 1443 may then decode the uplink transmission to recover the information (e.g., data block(s)) included in the transmission.

In some examples, the at least one resource may include at least one code block. In some examples, the process may further include receiving at least one indication that specifies a quantity (the number) of the at least one code block in the subset. In some examples, the process may further include receiving at least one indication that specifies at least one position of the at least one code block in the subset.

In some examples, the process may further include determining that a first subset of the at least one resource has been subjected to puncturing. In some examples, the receiving the information may include receiving the information from the user equipment via a second subset of the at least one resource that is different from the first subset of the at least one resource.

In some examples, determining that the user equipment selected a first allocation may include receiving at least one indication that the user equipment has selected an allocation. The at least one indication may take different forms in different implementations. In some examples, the at least one indication indicates that the user equipment did not use all of the at least one resource to send the information. In some examples, the at least one indication indicates a quantity of resources that the apparatus used to send the information. In some examples, the at least one indication indicates that the user equipment used a lower MCS than the at least one MCS to send the information. In some examples, the at least one indication identifies an MCS value that the apparatus used to send the information. In some examples, the at least one indication indicates that the user equipment is being constrained by a maximum permissible exposure (MPE) limit. In some examples, the at least one indication may specify at least one of a quantity of code block groups (CBGs), a quantity of resource blocks (RBs), a quantity of resource block groups (RBGs), or any combination thereof.

In some examples, the at least one indication is received via a subset of the at least one resource. In some examples, the at least one indication may be a demodulation reference signal (DMRS). In some examples, the DMRS is received via a subset of the at least one resource. In some examples, the at least one indication is received via a first portion of the subset that precedes a second portion of the subset that carries the information.

In some examples, the at least one indication is received via a data block and the at least one indication indicates whether the base station used the data block to send the information. In some examples, the at least one indication is received at a beginning of the data block. In some examples, the at least one indication is received at an end of the data block.

In some examples, the information is received via a transport block including a media access control (MAC) header. In addition, the at least one indication may be received via the transport block and external to the MAC header.

In some examples, the grant is for an uplink transmission by the user equipment; and the at least one indication is received via uplink control information. In some examples, the grant is for an uplink transmission by the user equipment; and the at least one indication is received via a physical uplink control channel (PUCCH).

The process may include one or more other operations in some implementations. In some examples, the process may further include sending another indication that the user equipment is allowed to select an allocation, wherein the at least one indication is received after the other indication is sent. In some examples, the process may further include receiving a request from the user equipment to select an allocation, wherein the other indication is sent after the request is received.

Figure 16:
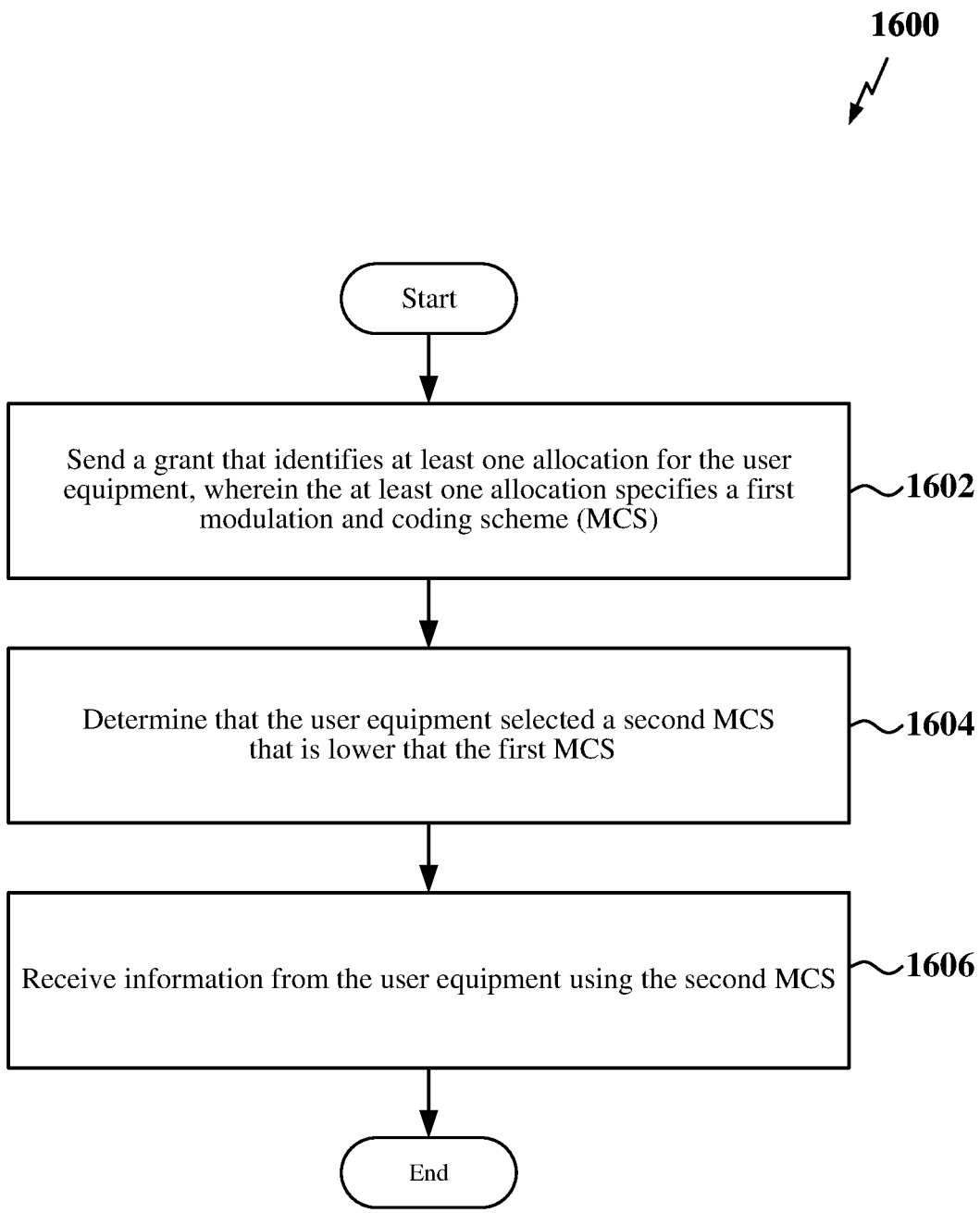
FIG. 16 is a flow chart of another example process based on dynamically used grant resources according to some aspects.

FIG. 16 is a flow chart illustrating an example process 1600 for wireless communication in accordance with some aspects of the present disclosure. As described below, some or all illustrated features may be omitted in a particular implementation within the scope of the present disclosure, and some illustrated features may not be required for implementation of all embodiments. In some examples, the process 1600 may be carried out by the BS 1400 illustrated in FIG. 14. In some examples, the process 1600 may be carried out by any suitable apparatus or means for carrying out the functions or algorithm described below.

At block 1602, a BS send a grant that identifies at least one allocation for the user equipment, wherein the at least one allocation specifies a first modulation and coding scheme (MCS). For example, the scheduling circuitry 1442, shown and described above in connection with FIG. 14, may generate a grant that includes scheduling information for a UE. The scheduling circuitry 1442 together with the communication and processing circuitry 1441 and the transceiver 1410, shown and described above in connection with FIG. 14, may then transmit the grant on a downlink control channel (e.g., a PDCCH) via a resource designated for the UE.

At block 1604, the BS may determine that the user equipment selected a second MCS that is lower that the first MCS. For example, the modification processing circuitry 1443 together with the communication and processing circuitry 1441 and the transceiver 1410, shown and described above in connection with FIG. 14, may compare the MCS specified by the grant with the MCS used or to be used by the UE for a transmission to the BS via an uplink channel (e.g., PUSCH).

At block 1606, the BS may receive information from the user equipment using the second MCS. For example, the modification processing circuitry 1443 together with the communication and processing circuitry 1441 and the transceiver 1410 may monitor designated resources allocation for an uplink transmission by the UE (e.g., on PDSCH). The modification processing circuitry 1443 may then use the second MCS to decode the uplink transmission to recover the information (e.g., data block(s)) included in the transmission.

In some examples, determining that the user equipment selected a second MCS may include receiving at least one indication specifying that the user equipment used a lower MCS than the first MCS to send the information. In some examples, determining that the user equipment selected a second MCS may include receiving at least one indication specifying a value of the second MCS.

In some examples, the process may further include receiving an indication of an MCS value that the user equipment used to send the information, wherein the receiving the information may include receiving the information using the MCS value.

In some examples, the process may further include receiving an indication that that the user equipment a lower MCS value than the first MCS to send the information, and determining the lower MCS value. In this case, receiving the information may include receiving the information using the lower MCS value.

The following provides an overview of several aspects of the present disclosure.

Aspect 1: A method for wireless communication at a user equipment, the method comprising: receiving a grant that identifies at least one allocation for the user equipment, wherein the at least one allocation comprises at least one resource; selecting a first allocation that is a subset of the at least one allocation; and sending information to a base station via the first allocation.

Aspect 2: The method of aspect 1, wherein the at least one resource comprises at least one of a code block group (CBG), a resource block (RB), a resource block group (RBG), or a combination thereof.

Aspect 3: The method of aspect 1 or 2, wherein the at least one resource comprises at least one code block.

Aspect 4: The method of aspect 3, further comprising: sending at least one indication that specifies a quantity of the at least one code block in the subset.

Aspect 5: The method of aspect 3, further comprising: sending at least one indication that specifies at least one position of the at least one code block in the subset.

Aspect 6: The method of any of aspects 1 through 5, wherein the sending of the information comprises applying puncturing to the at least one resource.

Aspect 7: The method of any of aspects 1 through 6, further comprising: sending at least one indication of the selecting of the first allocation to the base station.

Aspect 8: The method of aspect 7, wherein the at least one indication indicates at least one of: that the user equipment used only a portion of the at least one resource to send the information, a quantity of resources that the user equipment used to send the information, or a combination thereof.

Aspect 9: The method of aspect 7, wherein the at least one indication indicates that the user equipment used a lower modulation and coding scheme (MCS) than at least one MCS indicated by the at least one allocation to send the information or the at least one indication identifies an MCS value that the user equipment used to send the information.

Aspect 10: The method of aspect 7, wherein: the sending of the at least one indication comprises sending the at least one indication via a data block; and the at least one indication indicates whether the data block is used by the user equipment to send the information.

Aspect 11: The method of aspect 10, wherein the sending of the at least one indication comprises sending the at least one indication at a beginning of the data block.

Aspect 12: The method of aspect 10, wherein the sending of the at least one indication comprises sending the at least one indication at an end of the data block.

Aspect 13: The method of aspect 7, further comprising: receiving another indication that the user equipment is allowed to select an allocation, wherein the selecting of the first allocation is triggered based on the receiving of the other indication.

Aspect 14: The method of aspect 13, further comprising: sending a request to select the allocation, wherein the other indication is received after the request is sent.

Aspect 15: The method of aspect 7, wherein the at least one indication comprises at least one of a quantity of code block groups (CBGs), a quantity of resource blocks (RBs), a quantity of resource block groups (RBGs), or any combination thereof.

Aspect 16: The method of aspect 7, wherein: the sending of the information comprises sending the information via a transport block comprising a media access control (MAC) header; and the at least one indication is sent via the transport block and external to the MAC header.

Aspect 17: The method of aspect 7, wherein the at least one indication is sent via a subset of the at least one resource.

Aspect 18: The method of aspect 17, wherein the at least one indication is sent via a first portion of the subset that precedes a second portion of the subset that carries the information.

Aspect 19: The method of aspect 7, wherein the at least one indication comprises a demodulation reference signal (DMRS).

Aspect 20: The method of aspect 19, wherein the DMRS is sent via a subset of the at least one resource.

Aspect 21: The method of aspect 7, wherein: the grant is for an uplink transmission; and the at least one indication is sent via at least one of uplink control information, a physical uplink control channel (PUCCH), or a combination thereof.

Aspect 22: A user equipment (UE) comprising: a transceiver, a memory, and a processor communicatively coupled to the transceiver and the memory, wherein the processor and the memory are configured to perform any one of aspects 1 through 21.

Aspect 23: An apparatus configured for wireless communication comprising at least one means for performing any one of aspects 1 through 21.

Aspect 24: A non-transitory computer-readable medium storing computer-executable code, comprising code for causing an apparatus to perform any one of aspects 1 through 20.

Aspect 25: A method for wireless communication at a base station, the method comprising: sending a grant that identifies at least one allocation for a user equipment to send information, wherein the at least one allocation comprises at least one resource; determining that the user equipment selected a first allocation that is a subset of the at least one allocation; and receiving the information from the user equipment via the first allocation.

Aspect 26: The method of aspect 25, wherein the at least one resource comprises at least one of a code block group (CBG), a resource block (RB), a resource block group (RBG), or a combination thereof.

Aspect 27: The method of any of aspects 25 through 26, wherein the at least one resource comprises at least one code block.

Aspect 28: The method of aspect 27, further comprising: receiving at least one indication that specifies a quantity of the at least one code block in the subset.

Aspect 29: The method of aspect 27, further comprising: receiving at least one indication that specifies at least one position of the at least one code block in the subset.

Aspect 30: The method of any of aspects 25 through 29, wherein: the method further comprises determining that a first subset of the at least one resource has been subjected to puncturing; and the receiving the information comprises receiving the information from the user equipment via a second subset of the at least one resource that is different from the first subset of the at least one resource.

Aspect 31: The method of any of aspects 25 through 30, wherein the determining that the user equipment selected the first allocation comprises: receiving at least one indication that the user equipment selected the first allocation.

Aspect 32: The method of aspect 31, wherein: the receiving the at least one indication comprises receiving the at least one indication via a data block; the at least one indication indicates whether the apparatus used the data block to send the information.

Aspect 33: The method of aspect 32, wherein the receiving the at least one indication comprises receiving the at least one indication at a beginning of the data block.

Aspect 34: The method of aspect 32, wherein the receiving the at least one indication comprises receiving the at least one indication at an end of the data block.

Aspect 35: The method of aspect 31, further comprising: sending another indication that the user equipment is allowed to select an allocation, wherein the receiving the at least one indication comprises receiving the at least one indication after the other indication is sent.

Aspect 36: The method of aspect 35, further comprising: receiving a request from the user equipment to select an allocation, wherein the sending the other indication comprises sending the other indication after the request is received.

Aspect 37: The method of aspect 31, wherein the at least one resource comprises at least one of a code block group (CBG), a resource block (RB), a resource block group (RBG), or any combination thereof.

Aspect 38: The method of aspect 31, wherein the at least one indication comprises at least one of a quantity of code block groups (CBGs), a quantity of resource blocks (RBs), a quantity of resource block groups (RBGs), or any combination thereof.

Aspect 39: The method of aspect 31, wherein: the information is received via a transport block comprising a media access control (MAC) header; and the receiving the at least one indication comprises receiving the at least one indication via the transport block and external to the MAC header.

Aspect 40: The method of aspect 31, wherein the receiving the at least one indication comprises receiving the at least one indication via a subset of the at least one resource.

Aspect 41: The method of aspect 40, wherein the receiving the at least one indication comprises receiving the at least one indication via a first portion of the subset that precedes a second portion of the subset that carries the information.

Aspect 42: The method of aspect 31, wherein the at least one indication comprises a demodulation reference signal (DMRS).

Aspect 43: The method of aspect 42, further comprising: receiving the DMRS via a subset of the at least one resource.

Aspect 44: The method of aspect 31, wherein: the grant is for an uplink transmission by the user equipment; and the receiving the at least one indication comprises receiving the at least one indication via at least one of uplink control information, a physical uplink control channel (PUCCH), or a combination thereof.

Aspect 45: The method of aspect 31, wherein the at least one indication indicates that the user equipment is being constrained by a maximum permissible exposure (MPE) limit.

Aspect 46: A base station (BS) comprising: a transceiver, a memory, and a processor communicatively coupled to the transceiver and the memory, wherein the processor and the memory are configured to perform any one of aspects 25 through 45.

Aspect 47: An apparatus configured for wireless communication comprising at least one means for performing any one of aspects 25 through 45.

Aspect 48: A non-transitory computer-readable medium storing computer-executable code, comprising code for causing an apparatus to perform any one of aspects 25 through 45.

Aspect 49: A method for wireless communication at a user equipment, the method comprising: receiving a grant that identifies at least one allocation for the user equipment, wherein the at least one allocation specifies a first modulation and coding scheme (MCS); selecting a second MCS that is lower that the first MCS; and sending information to a base station using the second MCS.

Aspect 50: The method of aspect 49, further comprising: determining that a lower MCS than the first MCS should be used for sending the information, wherein the selecting of the second MCS is triggered based on the determination.

Aspect 51: The method of any of aspects 49 through 50, further comprising: accessing an MCS table; and using a subset of the MCS table for the selecting of the first MCS.

Aspect 52: The method of any of aspects 49 through 51, further comprising: sending at least one indication specifying that the apparatus used a lower MCS than the first MCS to send the information.

Aspect 53: The method of any of aspects 49 through 52, further comprising: sending at least one indication specifying a value of the first MCS.

Aspect 54: A user equipment (UE) comprising: a transceiver configured to communicate with a radio access network, a memory, and a processor communicatively coupled to the transceiver and the memory, wherein the processor and the memory are configured to perform any one of aspects 49 through 53.

Aspect 55: An apparatus configured for wireless communication comprising at least one means for performing any one of aspects 49 through 53.

Aspect 56: A non-transitory computer-readable medium storing computer-executable code, comprising code for causing an apparatus to perform any one of aspects 49 through 53.

Aspect 57: A method for wireless communication at a base station, the method comprising: sending a grant that identifies at least one allocation for a user equipment, wherein the at least one allocation specifies a first modulation and coding scheme (MCS); determining that the user equipment selected a second MCS that is lower that the first MCS; and receiving information from the user equipment using the second MCS.

Aspect 58: The method of aspect 57, wherein the determining that the user equipment selected a second MCS comprises: receiving at least one indication specifying that the user equipment used a lower MCS than the first MCS to send the information.

Aspect 59: The method of any of aspects 57 through 58, wherein the determining that the user equipment selected a second MCS comprises: receiving at least one indication specifying a value of the second MCS.

Aspect 60: The method of any of aspects 57 through 59, further comprising: receiving an indication of an MCS value that the user equipment used to send the information, wherein the receiving the information comprises receiving the information using the MCS value.

Aspect 61: The method of any of aspects 57 through 60, further comprising: receiving an indication that that the user equipment a lower MCS value than the first MCS to send the information; and determining the lower MCS value, wherein the receiving the information comprises receiving the information using the lower MCS value.

Aspect 62: A base station (BS) comprising: a transceiver, a memory, and a processor communicatively coupled to the transceiver and the memory, wherein the processor and the memory are configured to perform any one of aspects 57 through 61.

Aspect 63: An apparatus configured for wireless communication comprising at least one means for performing any one of aspects 57 through 61.

Aspect 64: A non-transitory computer-readable medium storing computer-executable code, comprising code for causing an apparatus to perform any one of aspects 57 through 61.

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-16 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in any of FIGS. 1-16 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication at a user equipment, comprising:
   receiving downlink control information (DCI) via a unicast physical downlink control channel (PDCCH), the DCI comprising a single grant that identifies a resource allocation scheduled by a base station for a transmission by the user equipment, wherein the resource allocation comprises at least one resource associated with a physical uplink shared channel (PUSCH);
   selecting a first allocation that is a subset of the resource allocation of the single grant;
   sending, via uplink control information, at least one indication of the selecting of the first allocation to the base station; and
   sending information to the base station via the first allocation after the at least one indication is sent.

2. The method of claim 1, wherein the at least one resource comprises at least one of a code block group (CBG), a resource block (RB), a resource block group (RBG), or a combination thereof.

3. The method of claim 1, wherein the at least one resource comprises at least one code block.

4. The method of claim 3, further comprising:
   sending at least one indication that specifies a quantity of the at least one code block in the subset.

5. The method of claim 3, further comprising:
   sending at least one indication that specifies at least one position of the at least one code block in the subset.

6. The method of claim 1, wherein the sending of the information comprises applying puncturing to the at least one resource.

7. The method of claim 1, wherein the at least one indication indicates at least one of: that the user equipment used only a portion of the at least one resource to send the information, a quantity of resources that the user equipment used to send the information, or a combination thereof.

8. The method of claim 1, wherein the at least one indication indicates that the user equipment used a lower modulation and coding scheme (MCS) than at least one MCS indicated by the resource allocation to send the information or the at least one indication identifies an MCS value that the user equipment used to send the information.

9. The method of claim 1, wherein:
   the sending of the at least one indication comprises sending the at least one indication via a data block; and
   the at least one indication indicates whether the data block is used by the user equipment to send the information.

10. The method of claim 9, wherein the sending of the at least one indication comprises sending the at least one indication at a beginning of the data block.

11. The method of claim 9, wherein the sending of the at least one indication comprises sending the at least one indication at an end of the data block.

12. The method of claim 1, further comprising:
receiving another indication that the user equipment is allowed to select an allocation,
wherein the selecting of the first allocation is triggered based on the receiving of the other indication.

13. The method of claim 12, further comprising:
sending a request to select an allocation,
wherein the other indication is received after the request is sent.

14. The method of claim 1, wherein the at least one indication specifies at least one of a quantity of code block groups (CBGs), a quantity of resource blocks (RBs), a quantity of resource block groups (RBGs), or any combination thereof.

15. The method of claim 1, wherein:
the sending of the information comprises sending the information via a transport block comprising a medium access control (MAC) header; and
the at least one indication is sent via the transport block and external to the MAC header.

16. The method of claim 1, wherein the at least one indication is sent via a subset of the at least one resource.

17. The method of claim 16, wherein the at least one indication is sent via a first portion of the subset of the at least one resource that precedes a second portion of the subset of the at least one resource that carries the information.

18. A user equipment, comprising:
a memory comprising processor-executable instructions; and
a processor configured to execute the processor-executable instructions and cause the user equipment to:
receive downlink control information (DCI) via a unicast physical downlink control channel (PDCCH), the DCI comprising a single grant that identifies a resource allocation scheduled by a base station for a transmission by the user equipment, wherein the resource allocation comprises at least one resource associated with a physical uplink shared channel (PUSCH);
select a first allocation that is a subset of the resource allocation of the single grant;
send, via uplink control information, at least one indication of the selection of the first allocation to the base station; and
send information to the base station via the first allocation after the at least one indication is sent.

19. The user equipment of claim 18, wherein the processor is further configured to execute the processor-executable instructions and cause the user equipment to:
send the information based on a puncture of the at least one resource.

20. The user equipment of claim 19, wherein:
the transmission is an uplink transmission; and
the puncture is applied to the PUSCH.

21. The user equipment of claim 19, wherein:
the subset comprises a first subset of the at least one resource; and
the puncture is applied to a second subset of the at least one resource that is different from the first subset.

22. The user equipment of claim 18, wherein:
the processor is further configured to execute the processor-executable instructions and cause the user equipment to determine that the information can be sent using less than the at least one resource; and
the selection of the first allocation is triggered based on the determination.

23. The user equipment of claim 22, wherein:
the processor is further configured to execute the processor-executable instructions and cause the user equipment to determine a minimum number of resources to send the information; and
the selection of the first allocation is based on the determination of the minimum number of resources.

24. The user equipment of claim 18, wherein:
the processor is further configured to execute the processor-executable instructions and cause the user equipment to determine that transmit power of the user equipment is limited; and
the selection of the first allocation is triggered based on the determination.

25. The user equipment of claim 18, wherein:
the processor is further configured to execute the processor-executable instructions and cause the user equipment to determine that a lower modulation and coding scheme (MCS) than at least one MCS indicated by the resource allocation should be used for sending the information; and
the selection of the first allocation is triggered based on the determination.

26. The user equipment of claim 18, wherein the processor is further configured to execute the processor-executable instructions and cause the user equipment to:
receive a modulation and coding scheme (MCS) table; and
use a subset of the MCS table for the selection of the first allocation.

* * * * *